(12) United States Patent
Koganehira et al.

(10) Patent No.: US 8,801,845 B2
(45) Date of Patent: Aug. 12, 2014

(54) INK COMPOSITION

(75) Inventors: Shuichi Koganehira, Matsumoto (JP); Shinichi Yamamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/417,648

(22) Filed: Mar. 12, 2012

(65) Prior Publication Data

US 2012/0227619 A1  Sep. 13, 2012

(30) Foreign Application Priority Data

Mar. 11, 2011  (JP) ................................. 2011-054245
Mar. 11, 2011  (JP) ................................. 2011-054251

(51) Int. Cl.
*C09D 11/02*  (2014.01)

(52) U.S. Cl.
USPC ....................................... 106/31.36; 106/31.7

(58) Field of Classification Search
USPC ............................................ 106/31.36, 31.7
See application file for complete search history.

(56) References Cited

U.S. PATENT DOCUMENTS

| | | | |
|---|---|---|---|
| 6,715,868 B2 | 4/2004 | Schmidt et al. | |
| 7,229,489 B2 | 6/2007 | Yatake | |
| 7,537,652 B2 | 5/2009 | Koganehira et al. | |
| 7,553,360 B2 | 6/2009 | Koganehira et al. | |
| 7,686,876 B2 | 3/2010 | Koganehira et al. | |
| 7,955,425 B2 | 6/2011 | Koganehira et al. | |
| 8,021,472 B2 | 9/2011 | Koganehira et al. | |
| 8,105,427 B2 | 1/2012 | Koganehira et al. | |
| 8,110,033 B2 | 2/2012 | Mizutani et al. | |
| 2003/0106462 A1* | 6/2003 | Yatake et al. | 106/31.59 |
| 2004/0020407 A1* | 2/2004 | Kato | 106/31.6 |
| 2005/0176848 A1 | 8/2005 | Chen et al. | |
| 2005/0235870 A1 | 10/2005 | Ishihara | |
| 2006/0196390 A1 | 9/2006 | Rehman et al. | |
| 2007/0040880 A1 | 2/2007 | Jackson et al. | |
| 2007/0247504 A1 | 10/2007 | Koganehira et al. | |
| 2008/0233363 A1 | 9/2008 | Goto | |
| 2008/0259100 A1* | 10/2008 | Rengaswamy et al. | 347/1 |
| 2009/0176071 A1 | 7/2009 | Koganehira et al. | |
| 2009/0297716 A1 | 12/2009 | Koganehira et al. | |
| 2010/0080962 A1 | 4/2010 | Koganehira et al. | |
| 2010/0086685 A1 | 4/2010 | Mizutani et al. | |
| 2010/0087595 A1 | 4/2010 | Koganehira et al. | |
| 2010/0289848 A1 | 11/2010 | Koganehira et al. | |
| 2010/0321430 A1 | 12/2010 | Koganehira et al. | |
| 2011/0118399 A1 | 5/2011 | Koganehira et al. | |
| 2011/0192317 A1 | 8/2011 | Koganehira | |
| 2011/0265686 A1 | 11/2011 | Koganehira et al. | |
| 2012/0073468 A1* | 3/2012 | Koganehira et al. | 106/31.13 |
| 2012/0227620 A1 | 9/2012 | Koganehira et al. | |

FOREIGN PATENT DOCUMENTS

| | | | |
|---|---|---|---|
| JP | 11080629 A | * | 3/1999 |
| JP | 2003-213179 A | | 7/2003 |
| JP | 2003-253167 A | | 9/2003 |
| JP | 2004-526019 A | | 8/2004 |
| JP | 2005-194500 A | | 7/2005 |
| JP | 2005-226073 A | | 8/2005 |
| JP | 2006-249429 A | | 9/2006 |
| JP | 2007-277342 A | | 10/2007 |
| JP | 2009-506166 A | | 2/2009 |
| JP | 2009-209338 A | | 9/2009 |
| JP | 2009-209339 A | | 9/2009 |
| JP | 2009-209340 A | | 9/2009 |
| WO | 02-066565 A1 | | 8/2002 |
| WO | 2007024834 A1 | | 3/2007 |
| WO | 2007-116902 A1 | | 10/2007 |
| WO | 2008143086 A1 | | 11/2008 |

OTHER PUBLICATIONS

Machine English Translation of JP 11-080629.*

* cited by examiner

*Primary Examiner* — Veronica F Faison

(74) *Attorney, Agent, or Firm* — Nutter McClennen & Fish LLP; John J. Penny, V.

(57) ABSTRACT

An ink composition includes a first saccharide and a second saccharide. The first saccharide is a linear saccharide having 4 or more saccharide units and the second saccharide is at least one selected from the group consisting of trehalose, maltotriose, and a cyclic saccharide.

9 Claims, No Drawings

INK COMPOSITION

The entire disclosure of Japanese Application No.: 2011-054251 filed on Mar. 11, 2011 and 2011-054245 filed on Mar. 11, 2011 are expressly incorporated by reference herein.

BACKGROUND

1. Technical Field

The present invention relates to an ink composition from which recorded matter having good fixability can be obtained on various recording media, in particular, non-water-absorbing or low water-absorbing recording media such as synthetic paper and printing paper.

2. Related Art

Ink jet recording is a printing technique for forming a print by ejecting ink droplets and making the ink droplets adhere to a recording medium such as paper. Due to recent innovative advancement in ink jet recording technologies, ink jet recording is being increasingly employed in the field of high-definition printing that has previously been realized by silver halide photos and off-set printing. With this advancement, inks for ink jet recording have been developed which can produce images having glossiness of silver halide photos by using highly glossy recording media, i.e., special paper, comparable to the developing paper, art paper, and the like that have been used in the fields of silver halide photos and off-set printing. Moreover, inks for ink jet recording that can achieve the image quality of silver halide photos even when plain paper is used have also been developed.

Due to recent widespread of image-forming technologies using digital data, desk top publishing (DTP) has become popular in the fields of printing in particular. Even when printing is performed through DTP, a proof for correcting color is produced beforehand to confirm the gloss and color of actual prints. Ink jet recording is being applied to outputting of such proofs. In DTP, the print needs to have high color reproducibility and high color stability; thus, special paper for ink jet recording is normally used as recording media.

Proof paper, which is special paper for ink jet recording, is prepared such that a print made therefrom has the same gloss and color as those of an actually output print on printing paper. As such, the quality and material for specialty paper are appropriately adjusted according to the type of printing paper but it increases the production cost to make specialty paper that is compatible to many types of printing paper. Thus, for color proof usage, it is desirable from the technical viewpoint if ink jet recording can be performed on printing paper rather than specialty paper. If samples made by performing ink jet recording directly on printing paper without using special paper can be used as the final proof samples, the cost for proofing can be dramatically saved. Moreover, synthetic paper prepared by mixing inorganic fillers and the like with polyethylene resins, polypropylene resins, or polyester resins and forming the resulting mixtures into films is widely used in the field of printing and is attracting attentions as environmentally friendly products that have high recyclability. Thus, it is desirable from the environmental viewpoint if recording can be conducted on such synthetic paper.

Printing paper is coated paper having a coating layer for receiving oil-based inks on its surface but has a low water-absorbing property. Thus, when water-based pigmented inks commonly used in ink jet recording are used, the inks exhibit low permeability into the recording medium (printing paper) and bleeding or coalescence may occur in the images.

To address the problem described above, for example, Japanese Unexamined Patent Application Publication No. 2005-194500 (Patent Document 1) discloses a pigment-based ink that reduces bleeding and exhibits excellent glossiness on special paper, in which a polysiloxane compound is used as a surfactant and an alkanediol such as 1,2-hexanediol is used as a dissolving aid. Japanese Unexamined Patent Application Publication No. 2003-213179 (Patent Document 2), Japanese Unexamined Patent Application Publication No. 2003-253167 (Patent Document 3), and Japanese Unexamined Patent Application Publication No. 2006-249429 (Patent Document 4) propose that high-quality images can be obtained by controlling the permeability of inks into recording media through addition of glycerin, a diol such as 1,3-butanediol, or a triol alcohol solvent such as pentanetriol to inks. However, ink compositions that can create recorded matter having higher fixability are still in pursuit.

Thermal printers are used in the on-demand label-printing market in which receipts, tickets, coupons, tags, labels, etc., are printed at the site and immediately provided to the end customers. However, printed matter created by thermal printers cannot always be used in the environment such as cargo rooms such as containers, where the printed matter is exposed to high temperatures or may undergo discoloration when left in a room temperature for a long time. Various improvements have been made on ink compositions for ink jet recording in order to obtain high-quality images. Further improvements are required in terms of fixability of ink in order for the ink compositions to be suitable for use in on-demand label-printing market.

In the on-demand label-printing market, frequently, the sites where printers are installed are sensitive to smell. Although use of highly volatile solvents is preferred for quick-drying, the solvents remaining on the paper may adversely affect the adhesives used in wallets, and substances and things such as wallets in contact with the printed matter when the printed matter was put in wallets or the like.

SUMMARY

A first finding of the inventors is that recorded matter having good fixability can be obtained on various recording media, in particular, non-water-absorbing or low water-absorbing recording media such as synthetic paper and printing paper, by using an ink composition that contains a first saccharide and a second saccharide.

A second finding of the inventors is that beading is suppressed and high-quality image having high ink fixability can be formed on various recording media, in particular, non-water-absorbing or low water-absorbing recording media such as synthetic paper and printing paper, by using an ink composition that contains a sparingly water-soluble alkanediol having 7 to 10 carbon atoms, a linear saccharide serving as a first saccharide, and a cyclic saccharide serving as a second saccharide, and that the ink prepared therefrom has high storage stability.

Accordingly, a first advantage of the invention is to provide an ink composition that can form recorded matter having good fixability on various recording media, in particular, non-water-absorbing or low water-absorbing recording media such as synthetic paper and printing paper.

A second advantage of the invention is to provide an ink composition that can form a high-quality image with less beading and good ink fixability on various recording media, in particular, non-water-absorbing or low water-absorbing recording media such as synthetic paper and printing paper, and that offers good ink storage stability.

An ink composition according to a first aspect of the invention a first saccharide and a second saccharide.

An ink composition according to a second aspect of the invention contains a sparingly water-soluble alkanediol having 7 to 10 carbon atoms, a linear saccharide serving as a first saccharide, and a cyclic saccharide serving as a cyclic saccharide.

The ink composition according to first aspect can form recorded matter having good fixability on various recording media, in particular, non-water-absorbing or low water-absorbing recording media such as synthetic paper and printing paper. The ink composition of the invention has good fixability and does not always need a solvent. Thus, the ink composition can be satisfactorily used in the on-demand label-printing market where the amounts of solvents in the ink compositions are desirably decreased.

The ink composition according to the second aspect can form a high-quality image with less beading and good ink fixability on various recording media, in particular, non-water-absorbing or low water-absorbing recording media such as synthetic paper and printing paper, and offers good ink storage stability. The ink composition of the invention has good fixability and contains less solvents, rarely using solvents which cause odors. Thus, the ink composition can be satisfactorily used in the on-demand label-printing market where the amounts of solvents in the ink compositions are desirably decreased.

DESCRIPTION OF EXEMPLARY EMBODIMENTS

Definitions

In this specification, the hydrocarbon moiety of an alkanediol may be linear or branched.

In this specification, "sparingly water soluble" means that the solubility (amount of a solute in 100 g of water) in water at 20° C. is less than 1.0 g. In this specification, "miscibility" means a property of a material capable of being evenly dispersed or dissolved without coalescing or phase separation when the solubility (amount of a solute in 100 g of water) in water at 20° C. is 10.0 g.

In this specification, a "non-water-absorbing or sparingly-water-absorbing recording medium" means a recording medium that has no aqueous-ink-receiving layer or a recording medium that has a poor aqueous-ink-receiving layer. Quantitatively, a non-water-absorbing or low water-absorbing recording medium is a recording medium having a recording surface that absorbs 10 mL/m$^2$ or less of water according to a Bristow method from onset of the contact up to 30 msec1/2. The Bristow method is the most prevalent method for measuring the amount of liquid absorbed in a short time and is employed in Japan Technical Association of the Pulp and Paper Industry (TAPPI). The details of the test method are described in Standard No. 51, "Method for determining the liquid absorbability of paper and board (Bristow's method)" in "JAPAN TAPPI Paper Pulp Test Methods, version 2000".

Embodiment A

Ink Composition

An ink composition according to an embodiment A of the invention contains a first saccharide and a second saccharide. Recorded matter having good fixability can be obtained on various recording media, in particular, non-water-absorbing or low water-absorbing recording media such as synthetic paper and printing paper, by using an ink composition that contains a first saccharide and a second saccharide.

First Saccharide

The ink composition of this embodiment contains a first saccharide which is a linear tetra- or higher saccharide, more preferably a saccharide containing 4 to 300 saccharide units, and most preferably a saccharide containing 5 to 300 saccharide units. The molecular weight of the first saccharide is preferably 720 to 54000 and more preferably 900 to 54000. The first saccharide contained in the ink composition of this embodiment is not particularly limited as long as the effects of the invention are achieved but is preferably a polydextrose. When a linear saccharide having 4 or more saccharide units is used, the stringiness of the ink composition can be ensured and recorded matter having good fixability can be obtained.

Polydextrose is a glucose polymer obtained by polymerizing glucose units in a molten state (under high-temperature and reduced pressure) using a polycarboxylic acid such as citric acid as a catalyst. Since glucose units are linked at random, the glucose polymer is highly branched. A preferable example of the polydextrose is a polymer of glucose and polyol such as sorbitol since the aqueous solution thereof has a low viscosity. A polydextrose is manufactured by, for example, polymerizing 85 to 95% by mass of glucose, 5 to 15% by mass of sorbitol, and 0.5 to 3.0% by mass of citric acid in a molten state (under high temperature and reduced pressure). A more preferable example of the polydextrose is a reduced polydextrose which is a polymer of sorbitol and glucose. A reduced polydextrose is obtained by hydrogenating a polydextrose and hydrogenation can be conducted by an industrial method employed to manufacture sorbitol from glucose. A reduced polydextrose can be obtained by a known method of hydrogenating a polymer of sorbitol and glucose in the presence of a nickel catalyst (under high-temperature and high pressure).

The polydextrose is preferably purified. A polydextrose subjected to activated carbon treatment (decoloring treatment) or ion exchange resin treatment (removal of citric acid) is suitable for use in inks.

Commercially available products may also be used as the polydextrose. Examples thereof include polydextrose produced by Pfizer USA and Litesse, Litesse II, and Litesse III (trade names) produced by Danisco Japan. In particular, Litesse III is a reduced polydextrose subjected to decoloring and removal of citric acid and is thus preferable.

According to a preferred embodiment of the invention, the content of the first saccharide may be adequately determined as long as the effects described above are achieved. However, the first saccharide content relative to the entire ink composition is preferably 3.0 to 18.0 mass %, more preferably 3.0 to 9.0 mass %, and most preferably 6.0 to 9.0 mass %. When the first saccharide content is within the above-described range, recorded matter having good fixability can be obtained. When the first saccharide content in the ink composition is 9.0 mass % or less, higher drying and fixing properties can be obtained on non-water-absorbing or low-water-absorbing media.

Second Saccharide

The ink composition of this embodiment contains a second saccharide which is at least one selected from the group consisting of trehalose, maltotriose, and a cyclic saccharide.

Trehalose is a non-reducible disaccharide having 1,1-glucoside bonds between glucose units. Since trehalose is a non-reducible saccharide, browning due to the Maillard reaction does not occur, which is preferable from the viewpoint of ink storage stability. Moreover, trehalose has high solubility in water, high water retaining property, and notably low hygroscopicity. In particular, a high purity anhydrous trehalose has a significantly high solubility (69 g/100 g (20° C.)) in water but does not exhibit hygroscopicity at a humidity of 95% or less. Accordingly, when trehalose is brought into contact with water, it absorbs water and gives a gel. However, since trehalose does not show hygroscopicity in a normal environment (about 20° C. and 45% RH), trehalose can remain stable.

An example of a commercially available product of trehalose is TREHA fine powder (produced by Hayashibara Shoji, Inc.).

Trehalose can be produced from starch sugar by a usual method such as a fermentation method, a hydrolysis method, a transglucosylation method, a condensation method, an epimerization (isomerization) method, or a chemical crosslinking method. Solidification can also be performed by a usual method. That is, it is possible to employ a method including spray-drying a massecuite, i.e., a solution containing a saccharide, a method including naturally drying massecuite to cause massecuite to crystallize and solidify in blocks and pulverizing the blocks, and a method including recrystallizing a massecuite in a molten state by using seed crystals. The massecuite used may be any saccharide that helps exhibit low hygroscopicity described above and may contain two or more types of saccharides.

An example of a commercially available product of maltotriose is Oligotose (Sanwa Cornstarch Co., Ltd.). Maltotriose can be produced by a usual method as with trehalose.

The cyclic saccharide may be any cyclic saccharide that achieve the effects of the invention but is preferably a cyclodextrin. A cyclodextrin is a cyclic oligosaccharide and is preferably a compound that has a clathrate-forming ability. Cyclodextrins have basic skeletons constituted by glucose molecules bonded through α-1,4 glucoside bonds and are called α-cyclodextrin (six glucose molecules), β-cyclodextrin (seven glucose molecules), γ-cyclodextrin (eight glucose molecules), and δ-cyclodextrin (nine glucose molecules) according to the number of glucose molecules.

Cyclodextrins in general have a unique structure in which the outer side of the ring structure exhibits hydrophilicity and the inner side of the ring structure exhibits hydrophobicity (lipophilicity). Due to this unique structure, cyclodextrins are often capable of enclosing a lipophilic molecule smaller than the inner diameter of the ring structure to give a complex compound. Even when the molecule is larger than the inner diameter of the ring structure, as long as the molecule has a lipophilic portion smaller than the inner diameter of the ring structure, that portion often becomes enclosed in the cyclodextrin and a complex compound is formed as a result. The inner diameter of the cyclodextrins is, for example, 4.7 to 5.3 Å for α-cyclodextrin, 6.0 to 6.5 Å for β-cyclodextrin, and 7.5 to 8.3 Å for γ-cyclodextrin.

The cyclodextrins used in this embodiment are not particularly limited. For example, at least one selected from α-cyclodextrin, β-cyclodextrin, γ-cyclodextrin, and δ-cyclodextrin can be used. The cyclodextrins preferably have one or more substituents. Examples of the substituents of the cyclodextrins include an acyl group, a hydroxyalkyl group, an alkyl group, a glucosyl group, an amino group, and a carboxymethyl group. A cyclodextrin polymer crosslinked with a crosslinking agent such as epichlorohydrin or a polyvalent glycidyl ether, a branched cyclodextrin having a branched side chains such as glucose or mannose, a highly branched cyclic dextrin, etc., may also be used.

The cyclodextrins described above can be used alone or in combination of two or more. The substituent is preferably an alkyl group and more preferably a methyl group. In particular, methyl-β-cyclodextrin is preferred since it has a high solubility in water (30 mass % or more at 25° C.).

The method for making the second saccharide is not particularly limited and is adequately selected based on the ease of production, the cost, etc. An example of a method for making a cyclodextrin having no substituents is a method of causing an enzyme from Bacillus macerans to act upon starch. An example of a method for making a substituted second saccharide is a method in which a saccharide whose hydroxyl groups are partly deprotonated or a derivative thereof is used as an intermediate to carry out the reaction. A commercially available product may be used as the second saccharide. Examples thereof include CAVASOL and CAVAMAX (both produced by Wacker Chemie AG).

According to a preferred embodiment of the invention, the second saccharide content may be adequately determined as long as the effects described above are achieved. However, the content thereof relative to the entire ink composition is preferably 3.0 to 18.0 mass % and more preferably 3.0 to 9.0 mass %. The second saccharide content is preferably 3.0 to 9.0 mass % from the viewpoint of drying and fixing properties. More preferably, the second saccharide is a cyclic saccharide, the cyclic saccharide is a methylated β-cyclodextrin, and the cyclic saccharide content in the ink composition is 3.0 to 9.0 mass %.

The ratio of the content of the first saccharide to the content of the second saccharide is not particularly limited but is preferably 3:1 to 1:3 and more preferably 1:1 to 1:3. When the ratio of the first saccharide content to the second saccharide content is 1:1 to 1:3, recorded matter having better fixability can be obtained.

Other Saccharides

The ink composition may contain other saccharides in addition to the first and second saccharides as long as the effects of the invention are achieved. Examples of other saccharides include those that remain in a solid state even when left to stand still in a 20° C., 60% RH environment, for example.

Other saccharide may be at least one selected from the group consisting of isotrehalose, neotrehalose, and mannitol. Alternatively, maltosyltrehalose constituted by trehalose and maltose.

Isotrehalose and neotrehalose are non-reducible disaccharides having glucoside bonds. Since they are non-reducible saccharides, browning due to the Maillard reaction does not occur, which is preferable from the viewpoint of ink storage stability.

Other examples of the saccharide include linear maltooligosaccharides that have α-1,4 bonds only other than maltotriose, such as maltose, maltotetraose, maltopentaose, maltohexaose, maltoheptaose, maltooctaose, maltononaose, and maltodecaose. Yet other examples of the saccharide include branched maltooligosaccharides that have α-1,6 bonds in a molecule obtained from a branched portion of amylopectin, e.g., isomaltose, panose (glycosyl-maltose), and glycosyl-maltotriose. Other examples include maltitol, sorbitol, xylitol, erythritol, and sucrose. Among these, at least one selected from the group consisting of maltotetraose and maltopentaose is preferred due to high hygroscopicity. Reduced sugars of these may also be used.

Water-Soluble Alkanediol

An ink composition according to a preferred embodiment of the invention may contain a water-soluble alkanediol in addition to the first saccharide and the second saccharide.

According to a preferred embodiment of the invention, a water-soluble alkanediol has one or both ends terminated with hydroxyl groups and preferably has a branched chain. The water-soluble alkanediol is preferably an alkanediol having 3 or more carbon atoms and more preferably 3 to 6 carbon atoms. The water-soluble alkanediol contained in the ink composition is preferably 2-methyl-1,3-propanediol, 3-methyl-1,5-pentanediol, 1,5-pentanediol, 1,2-hexanediol, or 1,6-hexanediol and more preferably a water-soluble hexanediol such as 1,2-hexanediol or 1,6-hexanediol. Among these, 1,2-hexanediol is preferred. The water-soluble alkanediol may be 1,6-hexanediol since it offers good discharge stability at high frequencies. Since 1,2-hexanediol and 1,6-hexanediol are widely used in cosmetics and the like, they are suitable as solvents of ink compositions used in the on-demand label-printing market.

Coloring Material

The ink composition may contain a coloring material. The colorant may be a dye or a pigment but is preferably a pigment from the viewpoints of light-fastness and water resistance. The coloring material preferably contains the pigment and the dispersant below which can make the pigment disperse in the ink.

The pigment may be organic or inorganic and one or more types of pigments may be used. Examples of the inorganic pigment include titanium oxide, iron oxide, and carbon black produced by known methods such as a contact method, a furnace method, and a thermal method. Examples of the organic pigment include azo pigments (azo lakes, insoluble azo pigments, condensed azo pigments, chelate azo pigments, etc.), polycyclic pigments (e.g., phthalocyanine pigments, perylene pigments, perinone pigments, anthraquinone pigments, quinacridone pigments, dioxazine pigments, thioindigo pigments, isoindolinone pigments, quinophthalone pigments, etc.), dye chelates (e.g., basic dye chelates, acidic dye chelates, etc.), nitro pigments, nitroso pigments, and aniline black.

Specific examples of the pigments can be provided according to the type (color) of the ink composition to be obtained. Examples of the pigments for an yellow ink composition include C.I. Pigment Yellow 1, 2, 3, 12, 14, 16, 17, 73, 74, 75, 83, 93, 95, 97, 98, 109, 110, 114, 128, 129, 138, 139, 147, 150, 151, 154, 155, 180, and 185. They may be used alone or in combination. Among these, at least one selected from the group consisting of C.I. Pigment Yellow 74, 110, 128, and 129 is preferably used. Examples of the pigments for a magenta ink composition include C.I. Pigment Red 5, 7, 12, 48(Ca), 48(Mn), 57(Ca), 57:1, 112, 122, 123, 168, 184, 202, and 209; and C.I. Pigment Violet 19. They may be used alone or in combination. Among these, at least one selected from the group consisting of C.I. Pigment Red 122, 202, and 209 and C.I. Pigment Violet 19 is preferably used. They may be used alone or in combination and may be a solid solution. Examples of the pigments for a cyan ink composition include C.I. Pigment Blue 1, 2, 3, 15:2, 15:3, 15:4, 15:34, 16, 22, and 60; and C.I. Vat Blue 4 and 60. They may be used alone or in combination. Among these, C.I. Pigment blue 15:3 and/or 15:4 is preferably used, and C.I. Pigment Blue 15:3 is particularly preferably used.

Examples of the pigment for a black ink composition include inorganic pigments including carbons such as lampblack (C.I. Pigment Black 6), acetylene black, furnace black (C.I. Pigment Black 7), channel black (C.I. Pigment Black 7), carbon black (C.I. Pigment Black 7) and the like and iron oxide pigments; and organic pigments such as aniline black (C.I. Pigment Black 1). In a preferred embodiment, carbon black is preferably used. Specific examples of the carbon black include #2650, #2600, #2300, #2200, #1000, #980, #970, #966, #960, #950, #900, #850, MCF-88, #55, #52, #47, #45, #45L, #44, #33, #32, and #30 (products of Mitsubishi Chemical Corporation up to here), SpecialBlack 4A and 550, Printex 95, 90, 85, 80, 75, 45, and 40 (products of Degussa Corporation up to here), Regal 660, RmogulL, monarch 1400, 1300, 1100, 800, and 900 (products of Cabot Corporation up to here), Raven 7000, 5750, 5250, 3500, 2500 ULTRA, 2000, 1500, 1255, 1200, 1190 ULTRA, 1170, 1100 ULTRA, and Raven 5000 UIII (products of Columbian Chemicals Company up to here).

The concentration of the pigment is not particularly limited since the pigment concentration (content) can be adequately adjusted while preparing the ink composition. For example, when the pigment concentration is 1 to 4%, an image having suppressed granularity can be obtained. When the pigment concentration is 4 to 12%, an image having good coloring property can be obtained.

The pigments described above are preferably pigments kneaded with dispersants described below since the glossiness of the image, bronzing prevention, and the storage stability of the ink composition can all be achieved while a color image having higher glossiness can be formed.

Dispersant

The ink composition preferably contains at least one resin that serves as a dispersant for dispersing the coloring material, the at least one resin being selected from a styrene-acrylic acid copolymer resin, an oxyethyl acrylate resin, a urethane resin, and a fluorene resin. More preferably, the ink composition contains at least one resin selected from an oxyethyl acrylate resin and a fluorene resins. These copolymer resins adsorb to the pigment and improve the dispersibility.

Specific examples of hydrophobic monomers for the copolymer resins include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methylstyrene, vinyl toluene, and ortho-hydroxyethylated phenylphenol acrylate. These may be used alone or in combination.

Specific examples of the hydrophilic monomer include acrylic acid, methacrylic acid, maleic acid, and itaconic acid.

The copolymer resin of the hydrophobic monomer and the hydrophilic monomer described above is preferably one of a styrene-(meth)acrylic acid copolymer resin, a styrene-methylstyrene-(meth)acrylic acid copolymer resin, a styrene-maleic acid copolymer resin, a (meth)acrylic acid-(meth)acrylic acid ester copolymer resin, a styrene-(meth)acrylic acid-(meth)acrylic acid ester copolymer resin, and an ortho-hydroxyethylated phenylphenol acrylate-(meth)acrylic acid copolymer resin from viewpoints of achieving bronzing prevention and storage stability of the ink composition and forming a color image having better glossiness.

The copolymer resin may be a resin (styrene-acrylic acid resin) that contains a polymer obtained by a reaction of styrene with acrylic acid or an acrylic acid ester. Alternatively, the copolymer resin may be an acrylic acid-based water-soluble resin. Alternatively, their salts of sodium, potassium, ammonium, triethanolamine, triisopropanolamine, triethylamine, and diethanolamine may be used.

The acid value of the copolymer resin is preferably 50 to 320 and more preferably 100 to 250 from viewpoints of achieving bronzing prevention and storage stability of the ink composition and forming a color image having better glossiness.

The weight-average molecular weight (Mw) of the copolymer resin is preferably 2,000 to 30,000 and more preferably 2,000 to 20,000 from viewpoints of achieving bronzing prevention and storage stability of the ink composition and forming a color image having better glossiness.

The glass transition temperature (Tg, measured in accordance with Japanese Industrial Standards K6900) of the copolymer resin is preferably 30° C. or more and more preferably 50° C. to 130° C. from viewpoints of achieving bronzing prevention and storage stability of the ink composition and forming a color image having better glossiness.

In the pigment dispersion, the copolymer resin is adsorbed to the pigment in some cases and is left free in other cases. The maximum particle diameter of the copolymer resin is preferably 0.3 µm or less and the average particle diameter is preferably 0.2 µm or less (more preferably 0.1 µm or less) from viewpoints of achieving bronzing prevention and storage stability of the ink composition and forming a color image having better glossiness. The average particle diameter refers to an average of the dispersion diameter (accumulated 50% diameter) of particles of the pigment in the actual dispersion and can be measured with, e.g., Micro Track UPA (produced by Microtrac Inc.).

The copolymer resin content is preferably 20 to 50 parts by mass and more preferably 20 to 40 parts by mass relative to 100 parts by mass of the pigment from viewpoints of achieving bronzing prevention and storage stability of the ink composition and forming a color image having better glossiness.

An oxyethyl acrylate resin may be used as the copolymer resin. An oxyethyl acrylate resin is preferable since it decreases the initial viscosity of the ink, improves storage stability at high temperatures, and offers good clogging recoverability.

The oxyethyl acrylate resin is not particularly limited as long as it is a resin having an oxyethyl acrylate backbone but is preferably a compound represented by formula (I) below. Examples of the compound represented by formula (I) include a resin that contains, in terms of monomer molar ratio, 45% to 55% ortho-hydroxyethylated phenylphenol acrylate of CAS No. 72009-86-0, 20% to 30% acrylic acid of CAS No. 79-10-7, and 20% to 30% methacrylic acid of CAS No. 79-41-4. These may be used alone or in combination. Although the monomer constitutional ratio is not particularly limited, the content of the ortho-hydroxyethylated phenylphenol acrylate of CAS No. 72009-86-0 is preferably 70 to 85 mass %, the content of acrylic acid of CAS No. 79-10-7 is preferably 5 to 15 mass %, and the content of methacrylic acid of CAS No. 79-41-4 is preferably 10 to 20 mass %.

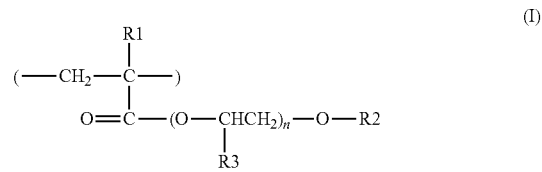

(where R1 and/or R3 represents a hydrogen atom or a methyl group, R2 represents an alkyl group or an aryl group, and n represents an integer of 1 or more).

The compound represented by formula (I) is preferably nonylphenoxy polyethylene glycol acrylate or polypropylene glycol #700 acrylate.

The oxyethyl acrylate resin content is preferably 10 to 40 parts by mass and more preferably 15 to 25 parts by mass relative to 100 parts by mass of the pigment from viewpoints of achieving initial viscosity of the ink composition, storage stability of the ink composition, suppression of the coalescence, and formation of color images having good filling property.

The total of the ratios of the resins derived from hydroxyl-containing monomers selected from acrylic acid and methacrylic acid in the oxyethyl acrylate resin is preferably 30% to 70% and more preferably 40% to 60% of the oxyethyl acrylate resin from the viewpoints of achieving the initial viscosity of the ink composition, the storage stability of the ink composition, and the clogging recoverability.

The number-average molecular weight (Mn) of the oxyethyl acrylate resin before crosslinking is preferably 4000 to 9000 and more preferably 5000 to 8000 from the viewpoints of initial viscosity of the ink composition and the storage stability of the ink composition. Mn is measured by, for example, gel permeation chromatography (GPC).

In the pigment dispersion, the oxyethyl acrylate resin is adsorbed to the pigment in some cases and left free in other cases. The maximum particle diameter of the copolymer resin is preferably 0.3 µn or less, and the average particle diameter is preferably 0.2 µm or less (more preferably 0.1 µm or less) from the viewpoints of achieving bronzing prevention and storage stability of the ink composition and forming a color image having better glossiness. The average particle diameter refers to an average of the dispersion diameter (accumulated 50% diameter) of particles of the pigment in the actual dispersion and can be measured with, e.g., Micro Track UPA (produced by Microtrac Inc.).

The oxyethyl acrylate resin content is preferably 20 to 50 parts by mass and more preferably 20 to 40 parts by mass relative to 100 parts by mass of the pigment from viewpoints of achieving bronzing prevention and storage stability of the ink composition and forming a color image having better glossiness.

When a urethane resin is used as a pigment dispersant for fixing, bronzing prevention and storage stability of the ink composition can be achieved and a color image having better glossiness can be formed. A urethane resin is a resin containing a polymer obtained by reacting a diisocyanate compound and a diol compound. The urethane resin is preferably a resin having a urethane bond and/or an amide bond, and an acidic group.

Examples of the diisocyanate compound include araliphatic diisocyanate compounds such as hexamethylene diisocyanate and 2,2,4-trimethylhexamethylene diisocyanate, aromatic diisocyanate compounds such as toluoylene diisocyanate and phenylmethane diisocyanate, and denaturated products thereof.

Examples of the diol compounds include polyethers such as polyethylene glycol and polypropylene glycol, polyesters such as polyethylene adipate and polybutylene adipate, and polycarbonates.

The acid value of the urethane resin is preferably 10 to 300 and more preferably 20 to 100 from viewpoints of achieving bronzing prevention and storage stability of the ink composition and forming a color image having better glossiness. The acid value is an amount (in terms of mg) of KOH needed to neutralize 1 g of resin.

The mass-average molecular weight (Mw) of the urethane resin before crosslinking is preferably 100 to 200,000 and more preferably 1,000 to 50,000 from viewpoints of achieving bronzing prevention and storage stability of the ink composition and forming a color image having better glossiness. Mw is measured by, for example, gel permeation chromatography (GPC).

The glass transition temperature (Tg, measured in accordance with Japanese Industrial Standards K6900) of the urethane resin is preferably −50° C. to 200° C. and more preferably −50° C. to 100° C. from viewpoints of achieving bronzing prevention and storage stability of the ink composition and forming a color image having better glossiness.

The urethane resin preferably contains a carboxyl group.

The urethane resin content is preferably 20 to 50 parts by mass and more preferably 20 to 40 parts by mass relative to 100 parts by mass of the pigment from viewpoints of achieving bronzing prevention and storage stability of the ink composition and forming a color image having better glossiness.

A fluorene resin may be used as a fixing pigment dispersant. A fluorene resin is preferable since it decreases the initial viscosity of the ink, improves storage stability at high temperatures, and offers good fixability to printing paper.

The fluorene resin is not particularly limited as long as it is a resin that has a fluorene backbone and, for example, can be obtained by copolymerizing the following monomer units.

5-isocyanato-1-(isocyanatomethyl)-1,3,3-trimethylcyclohexane (CAS No. 4098-71-9)

2,2'-[9H-fluoren-9-ylidenebis(4,1-phenyleneoxy)]bisethanol (CAS No. 117344-32-8)

3-hydroxy-2-(hydroxymethyl)-2-methylpropionic acid (CAS No. 4767-03-7)

N,N-diethyl-ethanamine (CAS No. 121-44-8)

The monomer composition ratio of the fluorene resin is not particularly limited as long as the resin has a fluorene backbone but is preferably 35 to 45 mass % 5-isocyanato-1-(isocyanatomethyl)-1,3,3-trimethylcyclohexane (CAS No. 4098-71-9), 40 to 60 mass % 2,2'-[9H-fluoren-9-ylidenebis(4,1-phenyleneoxy)]bisethanol (CAS No. 117344-32-8), 5 to 15 mass % 3-hydroxy-2-(hydroxymethyl)-2-methyl propionic acid (CAS No. 4767-03-7), and 5 to 15 mass % N,N-diethyl-ethanamine (CAS No. 121-44-8).

The number-average molecular weight (Mn) of the fluorene resin before crosslinking is preferably 2000 to 5000 and more preferably 3000 to 4000 from the viewpoints of initial viscosity of the ink composition and the storage stability of the ink composition. Mn is measured by, for example, gel permeation chromatography (GPC).

In the pigment dispersion, the fluorene resin is adsorbed on the pigment in some cases and left free in other cases. The maximum particle diameter of the copolymer resin is preferably 0.3 μm or less and the average particle diameter is preferably 0.2 μm or less (more preferably 0.1 μm or less) from the viewpoints of achieving bronzing prevention and storage stability of the ink composition and forming a color image having better glossiness. The average particle diameter refers to an average of the dispersion diameter (accumulated 50% diameter) of particles of the pigment in the actual dispersion and can be measured with, e.g., Micro Track UPA (produced by Microtrac Inc.).

The fluorene resin content is preferably 20 to 50 parts by mass and more preferably 20 to 40 parts by mass relative to 100 parts by mass of the pigment from viewpoints of achieving bronzing prevention and storage stability of the ink composition and forming a color image having better fixability.

The ratio of the mass of the copolymer resin to the mass of the fixing pigment dispersant is preferably 1/2 to 2/1 but is more preferably 1/1.5 to 1.5/1 from viewpoints of achieving bronzing prevention and storage stability of the ink composition and forming a color image having better glossiness.

The ratio of the mass of the solid content of the pigment to the total solid content of the copolymer resin and the fixing pigment dispersant is preferably 100/40 to 100/100 from viewpoints of achieving bronzing prevention and storage stability of the ink composition and forming a color image having better glossiness.

A surfactant may be used as the dispersant. Examples of the surfactant include anionic surfactants such as fatty acid salts, higher alkyl dicarboxylic acid salts, higher alcohol sulfuric acid ester salts, higher alkyl sulfonic acid salts, condensates of higher fatty acids and amino acids, sulfosuccinic acid ester salts, naphthenic acid salts, liquid fatty oil sulfuric acid ester salts, and alkyl allyl sulfonic acid salts; cationic surfactants such as fatty acid amine salts, quaternary ammonium salts, sulfonium salts, and phosphonium salts; and nonionic surfactants such as polyoxyethylene alkyl ethers, polyoxyethylene alkyl esters, sorbitan alkyl esters, and polyoxyethylene sorbitan alkyl esters. When the surfactant is added as the dispersant to the ink composition, it naturally serves as a surfactant also.

Surfactant

The ink composition for the ink jet recording may contain a surfactant. When a surfactant is used with a recording medium having a surface coated with a resin for receiving the ink, an image having good glossiness can be formed on a recording medium, such as photographic paper, that particularly requires good glossiness. In particular, bleeding between colors can be prevented and whitening caused by reflected light generated as the amount of adhered inks increases can be prevented even when a recording medium, such as printing paper, including a coating layer for receiving oil-based inks on its surface is used.

Polyorganosiloxane surfactants are preferred as the surfactant used in the ink composition. In forming an image to be recorded, the wettability to the recording medium surface is increased and the permeability of the ink can be increased. In the case where a polyorganosiloxane surfactant is used, the solubility of the surfactant in the ink improves and generation of the insoluble matter or the like can be suppressed. Thus, an ink composition having a higher ejection stability can be realized.

The polyorganosiloxane surfactant is not particularly limited but preferably has a dynamic surface tension of 26 mN/m or less at 1 Hz when prepared into an aqueous solution containing 20 mass % glycerin, 10 mass % 1,2-hexanediol, 0.1 mass % polyorganosiloxane surfactant, and 69.9 mass % water. The dynamic surface tension can be measured with, for example, a bubble pressure tensiometer BP2 (product of KRUSS GmbH).

Commercially available products may be used as the surfactant. For example, Olfine PD-501 and Olfine PD-570

(products of Nissin Chemical Industry Co., Ltd.) and BYK-347 and BYK-348 (products of BYK Additives and Instruments) can be used.

The polyorganosiloxane surfactant contains at least one compound represented by formula (II)

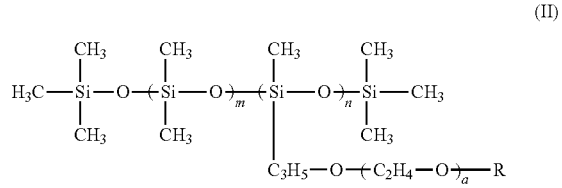

(wherein R represents a hydrogen atom or a methyl group, a represents an integer of 2 to 13, m represents an integer of 2 to 70, and n represents an integer of 1 to 8) or, preferably at least one compound represented by formula (II) above but with R representing a hydrogen atom or a methyl group, a representing an integer of 2 to 11, m representing an integer of 2 to 50, and n representing an integer of 1 to 5, or more preferably at least one compound represented by formula (II) above but with R representing a hydrogen atom or a methyl group, a representing an integer of 2 to 13, m representing an integer of 2 to 50, and n representing an integer of 1 to 5. Alternatively, the polyorganosiloxane surfactant more preferably contains at least one compound represented by formula (II) but with R representing a hydrogen atom or a methyl group, a representing an integer of 2 to 13, m representing an integer of 2 to 50, and n representing an integer of 1 to 8. Alternatively, the polyorganosiloxane surfactant preferably contains at least one compound represented by formula (II) but with R representing a methyl group, a representing an integer of 6 to 18, m representing an integer of 0 to 4, and n representing 1 or 2 and more preferably contains at least one compound represented by formula (II) but with R representing a methyl group, a representing an integer of 6 to 18, m representing 0, and n representing 1. When such polyorganosiloxane surfactants are used, ink coalescence can be improved even when printing is conducted on printing paper as a recording medium.

Among compounds represented by formula (II), a compound with a representing an integer of 2 to 5, m representing an integer of 20 to 40, and n representing an integer of 2 to 4, a compound with a representing an integer of 7 to 11, m representing an integer of 30 to 50, and n representing an integer of 3 to 5, a compound with a representing an integer of 9 to 13, m representing an integer of 2 to 4, and n representing an integer of 1 to 2, and a compound with a representing an integer of 6 to 10, m representing an integer of 10 to 20, and n representing an integer of 4 to 8 are more preferably used. When these compounds are used, the ink coalescence can be suppressed.

Among the compounds represented by formula (II) above, a compound with R representing a hydrogen atom, a representing an integer of 2 to 5, m representing an integer of 20 to 40, and n representing an integer of 2 to 4 or a representing an integer of 7 to 11, m representing an integer of 30 to 50, and n representing an integer of 3 to 5 is more preferably used. When such a compound is used, the coalescence of the ink and the bleeding can be further suppressed.

Among the compounds represented by formula (II) above, a compound with R representing a methyl group, a representing an integer of 9 to 13, m representing an integer of 2 to 4, and n representing an integer of 1 to 2 or a representing an integer of 6 to 10, m representing an integer of 10 to 20, and n representing an integer of 4 to 8 is more preferably used. When such a compound is used, the coalescence of the ink and the bleeding can be further suppressed.

Among the compounds represented by formula (II) above, a compound with R representing a methyl group, a representing an integer of 6 to 12, m representing 0, and n representing 1 is more preferably used. When such a compound is used, the coalescence of the ink and the bleeding can be further suppressed.

Among compounds represented by formula (II), a mixture containing a compound with R representing a hydrogen atom, a representing an integer of 7 to 11, m representing an integer of 30 to 50, and n representing an integer of 3 to 5, a compound with R representing a methyl group, a representing an integer of 9 to 13, m representing an integer of 2 to 4, and n representing an integer of 1 or 2, and a compound with R representing a methyl group, a representing an integer of 6 to 10, m representing an integer of 10 to 20, and n representing an integer of 4 to 8 is most preferably used. When these compounds are used, the coalescence of the ink and the bleeding can be further suppressed.

Among compounds represented by formula (II), a mixture containing a compound with R representing a hydrogen atom, a representing an integer of 7 to 11, m representing an integer of 30 to 50, and n representing an integer of 3 to 5, a compound with R representing a methyl group, a representing an integer of 9 to 13, m representing an integer of 2 to 4, and n representing an integer of 1 or 2, and a compound with R representing a methyl group, a representing an integer of 6 to 18, m representing 0, and n representing 1 is most preferably used. When these compounds are used, the coalescence of the ink and the bleeding can be further suppressed.

The polyorganosiloxane surfactant is not particularly limited but preferably has a dynamic surface tension of 26 mN/m or less at 1 Hz when prepared into an ink composition containing 20 mass % glycerin, 10 mass % 1,2-hexanediol, 0.1 mass % polyorganosiloxane surfactant, and 69.9 mass % water. The dynamic surface tension can be measured with, for example, a bubble pressure tensiometer BP2 (product of KRUSS GmbH).

The surfactant content in the ink composition is preferably 0.01 to 1.0 mass % and more preferably 0.05 to 0.50 mass %. In particular, when a surfactant represented by formula (II) with R representing a hydrogen group is used, it is preferable for the suppression of beading to decrease the amount of such a surfactant compared to when a surfactant represented by formula (II) with R representing a methyl group is used. When 0.01 to 0.1 mass % of a surfactant represented by formula (II) with R representing a hydrogen group is used, water repellency is exhibited and bleeding can be adjusted.

The ink composition may further contain another surfactant, namely, an acetylene glycol surfactant, an anionic surfactant, a nonionic surfactant, an ampholytic surfactant, or the like.

Examples of the acetylene glycol surfactant include 2,4,7,9-tetramethyl-5-decyn-4,7-diol, 3,6-dimethyl-4-octyn-3,6-diol, 3,5-dimethyl-1-hexyn-3-ol, and 2,4-dimethyl-5-hexyn-3-ol. Commercially available products may also be used as the acetylene glycol surfactant. Examples thereof include Olfine E1010, STG, and Y (trade names, products of Nissin Chemical Industry Co., Ltd.), and Surfynol 61, 104, 82, 465, 485, and TG (trade names, products of Air Products and Chemicals Inc.).

Water and Other Components

The ink composition preferably contains water as a solvent in addition to the first saccharide and the second saccharide described above. Water is preferably pure water or ultrapure water such as ion exchange water, ultrafiltered water, reverse osmosis water, or distilled water. Any one of these water sterilized by ultraviolet irradiation, hydrogen peroxide addition, or the like is preferred since generation of mold and bacteria can be prevented for a long time.

The ink composition may further contain a penetrant in addition to the components described above. For example, a glycol ether can be used as the penetrant.

Specific examples of the glycol ethers include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol-iso-propyl ether, dipropylene glycol mono-n-butyl ether, dipropylene glycol mono-tert-butyl ether, 3-methoxy-3-methyl-1-butanol, and 3-methoxy-1-butanol. These may be used alone or as a mixture of two or more.

Of the glycol ethers above, alkyl ethers of polyhydric alcohols are preferred. In particular, ethylene glycol monoethyl ether, ethylene glycol mono-n-butyl ether, diethylene glycol monomethyl ether, diethylene glycol monoethyl ether, propylene glycol monomethyl ether, propylene glycol monoethyl ether, propylene glycol monobutyl ether, triethylene glycol monomethyl ether, triethylene glycol mono-n-butyl ether, and 3-methoxy-1-butanol are preferred. Triethylene glycol monomethyl ether, triethylene glycol mono-n-butyl ether, and 3-methoxy-1-butanol are more preferable, and 3-methoxy-1-butanol is most preferable. Since 3-methoxy-1-butanol has a boiling point of 161° C., an ink having good quick-drying property and immediate fixability can be obtained.

The amount of the penetrant added may be appropriately determined but is preferably about 0.1 to 30 mass % and more preferably about 1 to 20 mass %.

The ink composition preferably further contains a recording medium-dissolving agent in addition to the components described above.

Pyrrolidones such as N-methyl-2-pyrrolidone, pyrrolidone carboxylic acid, and their alkali metal salts are preferably used as the recording medium-dissolving agent. The amount of the recording medium-dissolving agent added may be appropriately determined but is preferably about 0.1 to 30 mass % and more preferably about 1 to 20 mass %.

The ink composition preferably contains a humectant such as glycerin or its derivative, e.g., 3-(2-hydroxyethoxy)-1,2-propanediol (CAS 14641-24-8) or 3-(2-hydroxypropoxy)-1,2-propanediol. Glycerin and its derivatives are preferred since they prevent drying and solidification of inks in ink jet nozzles and improve the clogging recoverability. In this embodiment, 0.1 to 8 mass % of the humectants can be contained.

The ink composition of may further contain a nozzle clogging-preventing agent, a preservative, an antioxidant, a conductivity adjustor, a pH adjustor, a viscosity adjustor, a surface tension adjustor, an oxygen absorber, and the like.

Examples of the preservative and fungicide include sodium benzoate, sodium pentachlorophenol, sodium 2-pyridinethiol-1-oxide, sodium sorbate, sodium dehydroacetate, and 1,2-dibenzylthiazolin-3-one (Proxel CRL, Proxel BND, Proxel GXL, Proxel XL-2, and Proxel TN produced by ICI). When the second saccharide is a cyclic saccharide, the preservative and fungicide can be stably dissolved due to the clathration effect. Accordingly, the second saccharide preferably at least includes a cyclic saccharide.

Examples of the pH adjuster, dissolving aid, and antioxidant include amines such as diethanolamine, triethanolamine, propanolamine, and morpholine and their modified products; inorganic salts such as potassium hydroxide, sodium hydroxide, and lithium hydroxide; ammonium hydroxide and quaternary ammonium hydroxide (e.g., tetramethyl ammonium); carbonates such as potassium carbonate, sodium carbonate, and lithium carbonate; phosphates; N-methyl-2-pyrrolidone; ureas such as urea, thiourea, and tetramethylurea; allophanates such as allophanate and methyl allophanate; biurets such as biuret, dimethyl biuret, and tetramethyl biuret; and L-ascorbic acid and salts thereof.

The ink composition may contain an antioxidant and an ultraviolet absorber. Examples thereof include Tinuvin 328, 900, 1130, 384, 292, 123, 144, 622, 770, and 292, Irgacor 252 and 153, and Irganox 1010, 1076, 1035, and MD 1024 produced by Ciba Specialty Chemicals, and oxides of lanthanides.

The ink composition can be manufactured by dispersing and mixing the components described above by adequate techniques. Preferably, first, a pigment, a polymer dispersant, and water are mixed with each other in an adequate dispersing device (e.g., a ball mill, a sand mill, an attritor, a roll mill, an agitator mill, a Henschel mixer, a colloid mill, an ultrasonic homogenizer, a jet mill, or an angstrom mill) to prepare a homogeneous pigment dispersion, and then a resin (resin emulsion) separately prepared, water, a water-soluble organic solvent, a sugar, a pH adjuster, a preservative, a fungicide, and the like are added thereto to be sufficiently dissolved and to thereby prepare an ink solution. After thorough stirring, the mixture is filtered to remove coarse particles and foreign matter that cause clogging to obtain a desired ink composition. The filtration is preferably conducted with a glass fiber filter as a filter. The glass fiber is preferably a resin-impregnated glass fiber from the viewpoint of electrostatic adsorption functions. The pore diameter of the glass fiber filter is preferably 1 to 40 micrometers and more preferably 1 to 10 micrometers from the viewpoints of productivity and removal of charged free resins by adsorption. The ejection stability can be improved by sufficiently removing the charged free resins by adsorption. An example of the filter is Ultipor GF Plus filter produced by Pall Corporation.

Embodiment B

Ink Composition

Components contained in an ink composition according to an embodiment B of the invention will now be described. The ink composition of the embodiment B may contain components that are described as examples of the components of the ink composition of the embodiment A. Descriptions of the components described in relation to the ink composition of the embodiment A are basically omitted below.

An ink composition according to an embodiment B of the invention contains a sparingly water-soluble alkanediol having 7 to 10 carbon atoms, a linear saccharide serving as a first saccharide, and a cyclic saccharide serving as a cyclic saccharide. A high-quality image with less beading and high ink fixability can be formed on various recording media, in particular, a non-water-absorbing or low-water-absorbing recording media by using an ink composition that contains a sparingly water-soluble alkanediol having 7 to 10 carbon atoms, a cyclic saccharide, and a linear saccharide. The storage stability of the ink can also be improved.

In the specification, "beading" means density unevenness in similar colors that occurs locally when an image of one color is printed (e.g., when a 6-inch square image of one color ("one color" means that the number of colors printed is one and two or more ink compositions may be used to realize that color) is printed), and does not mean that some of the recording medium surface remains uncoated with inks.

In this embodiment, occurrence of curling, i.e., inward warpage of a printed surface, can be suppressed even when printing paper having a paper density of 73.3 to 209.2 g/m2, in particular, thin printing paper having a paper density of 73.3 to 104.7 g/m2, is used as the recording medium.

The reason why a high-quality image with less beading can be formed by incorporation of the sparingly water-soluble alkanediol having 7 to 10 carbon atoms, a cyclic saccharide, and a linear saccharide is not clear. However, the following can be presumed.

The cause of the beading of ink that occurs when recording is performed on a recording medium may be that droplets of ink having a surface tension higher than 24 mN/m that have landed on the recording medium move and flow. In other words, presumably, the contact angle of the ink droplet with respect to the recording medium is high and thus the recording medium repels the ink droplets. Accordingly, the surface tension of the ink needs to be decreased to suppress beading. However, when recording is conducted on a non-water-absorbing or low-water-absorbing recording medium, the water contained in the ink is not readily absorbed in the recording medium and thus even droplets of the ink having a surface tension of 20 to 24 mN/m flow and move.

In the specification, the surface tension is a value determined by a Wilhelmy method. The surface tension can be measured by the Wilhelmy method with automatic surface tensiometer CBVP-Z (produced by Kyowa Interface Science Co., Ltd.), for example.

In order to suppress ink beading on a non-water-absorbing or low-water-absorbing recording medium, not only it is preferable to decrease the surface tension of the ink but also it is preferable to suppress flowability after the ink has landed on a recording medium.

It is presumed that, according to the ink composition of the invention, an ink that has a low surface tension and is capable of forming ink droplets, flowability of which is suppressed after landing on the recording medium, can be provided and as a result, beading is effectively suppressed.

Sparingly Water-Soluble Alkanediol

The ink composition according to the embodiment B of the invention contains a sparingly water-soluble alkanediol having 7 to 10 carbon atoms (hereinafter this alkanediol is simply referred to as "sparingly water-soluble alkanediol").

According to a preferred embodiment, the sparingly water-soluble alkanediol having 7 to 10 carbon atoms is an alkanediol having an OH group at one end. According to a preferred embodiment, the sparingly water-soluble alkanediol having 7 to 10 carbon atoms is a sparingly water-soluble 1,2-alkanediol that can more effectively suppress beading. Examples of the sparingly water-soluble 1,2-alkanediol include 1,2-heptanediol, 1,2-octanediol, 5-methyl-1,2-hexanediol, 4-methyl-1,2-hexanediol, and 4,4-dimethyl-1,2-pentanediol. Among these, 1,2-octanediol is more preferred. Since 1,2-hexanediol is widely used in cosmetics and does not evaporate at room temperature, it is suitable as a solvent of ink compositions used in the on-demand label-printing market.

According to a preferred embodiment, the sparingly water-soluble alkanediol content may be appropriately determined as long as beading of ink is efficiently suppressed and a high-quality image can be formed but is preferably 1.0 to 3.0 mass % and more preferably 1.0 to 2.0 mass % relative to the entire composition. When the amount of the sparingly water-soluble alkanediol having 7 to 10 carbon atoms is within this range, the initial viscosity of the ink does not become excessively high, and separation of the oil layer can be effectively prevented in a normal storing state, which is preferable from the viewpoint of storage stability of the ink.

According to a preferred embodiment of the invention, the sparingly water-soluble alkanediol is 1,2-octanediol and the ink composition contains 1.0 to 3.0 mass % of the sparingly water-soluble alkanediol. When the content of the sparingly water-soluble alkanediol is not below the lower limit, beading of the ink can be suppressed. When the content of the sparingly water-soluble alkanediol is not beyond the upper limit, the viscosity of the ink can be suppressed to a low level. This is preferred from the viewpoint of ink storage stability.

Linear Saccharide

The ink composition of this embodiment contains a linear saccharide and preferably contains a linear saccharide having 4 or more saccharide units. Examples of the linear saccharide that can be used include those described in relation with the first saccharide in the embodiment A. Preferable examples of the linear saccharides and the saccharide content are the same as those in the embodiment A.

The total content of the sparingly water-soluble alkanediol having 7 to 10 carbon atoms and the linear saccharide is preferably 4.0 to 12.0 mass % and more preferably 9.0 to 12.0 mass %. When the total content of the sparingly water-soluble alkanediol and the linear saccharide is 9.0 to 12.0 mass %, a high-quality image with less beading can be formed.

The ratio of the sparingly water-soluble alkanediol content to the linear saccharide content is not particularly limited but is preferably 1:1 to 1:9 and more preferably 1:3 to 1:9. When the ratio of the sparingly water-soluble alkanediol content to the linear saccharide content is 1:3 to 1:9, a high-quality image with less beading can be formed.

Cyclic Saccharide

The ink composition of the invention contains a cyclic saccharide. Examples of the cyclic saccharide that can be used include cyclic saccharides listed as the second saccharide described in the embodiment A. Preferable examples of the cyclic saccharides and the saccharide content are the same as those in the embodiment A.

The ratio of the sparingly water-soluble alkanediol content to the cyclic saccharide content is not particularly limited but is preferably 1:1 to 1:9 and more preferably 1:1 to 1:3. When the ratio is within this range, the sparingly water-soluble solvent can be mixed (homogeneously dispersed or dissolved without causing coalescence or phase separation), which is preferable from the viewpoint of ink stability.

The ratio of the content of the cyclic saccharide to the content of the linear saccharide is not particularly limited but is preferably 3:1 to 1:3 and more preferably 1:1 to 1:3. When the ratio of the cyclic saccharide content to the linear saccharide content is 1:1 to 1:3, a high-quality image having good fixability can be formed.

Solid Humectant

The ink composition of this embodiment preferably contains a solid humectant that remains in a solid state even when it is left in a 20° C. 60% RH environment (such a solid humectant may hereinafter be simply referred to as "solid humectant"). The solid humectant may contain saccharides described in the previous section, "Other saccharides" in the embodiment A. The humectants are classified into a first solid humectant and a second solid humectant based on the physical properties. The solid humectant preferably contains at least one selected from the group consisting of a first solid humectant and a second solid humectant. The first solid humectant and the second solid humectant are described below in details.

First Solid Humectant

A first solid humectant preferred in this embodiment is a sugar that remains in a solid state even when it is left to stand still in a 20° C. 60% RH environment for 24 hours. The moisture absorption from 20° C./60% RH to 20° C./80% RH is preferably 0 mass % or more and less than 10 mass %. The first solid humectant preferably has a solubility of 30 mass % or more in 100 g of water at 20° C.

In this specification, the "moisture absorption from A° C./X % RH to B° C./Y % RH" is, for example, the value represented by the following equation:

(Moisture absorption (mass %))=100×($M_{B-Y}$−$M_{A-X}$)/$M_{A-X}$ $M_{A-X}$ is the mass after the material is left to stand still in a A° C., X % RH environment for 24 hours.

$M_{B-Y}$ is the mass after the material is left to stand still in a B° C., Y % RH environment for 24 hours.

The first solid humectant is not particularly limited as long as the effects of the invention are achieved but is preferably at least one selected from the group consisting of trehalose, isotrehalose, neotrehalose, and mannitol. The first saccharide may be a trisaccharide or higher saccharide that contains a saccharide selected from trehalose, isotrehalose, and neotrehalose. An example thereof is a maltosyltrehalose containing trehalose and maltose.

Isotrehalose and neotrehalose are non-reducible disaccharides having glucoside bonds. Since they are non-reducible saccharides, browning due to the Maillard reaction does not occur, which is preferable from the viewpoint of ink storage stability.

When an ink composition containing this first solid humectant is used, beading caused by nonuniform flow that occurs in high-speed printing can be suppressed. Although the exact reason for this is not clear, the following can be presumed. The first solid humectant contained in the ink composition adhering to a recording medium can form a gel (or solidify) by taking in water contained in the ink composition after adhering because the first saccharide has high solubility in water and high water retaining property. Thus, the gelled (or solidified) ink droplet exhibits suppressed flowability (flow nonuniformity). Moreover, according to the van't Hoff's law, inclusion of large amounts of water-soluble sugars increases the osmotic pressure and this may result in improvement of the penetration rate. High-speed printing is realized by suppression of beading and the color-reproducing region of prints is improved due to the increase in duty limitation value of the ink to be adhered to the recording medium.

Incorporation of the first solid humectant (trehalose) improves the beading property even when the linear saccharide content is less than 9.0 mass % or when the ratio of the content of the sparingly water-soluble alkanediol having 7 to 10 carbon atoms to the content of the linear saccharide is 1:1 to 1:3.

Recorded matter obtained by using an ink composition containing the first solid humectant can improve dewing resistance in a high-humidity environment at 20° C. and a humidity of about 60%.

In particular, the ink composition containing the first solid humectant can improve the clogging recoverability in an environment (closed system) in which the head is capped. Although the reason for this is not clear, it is presumed that the ink composition remaining in the cap does not take away the moisture from the ink composition in the head because of its low hygroscopicity and this presumably improves the clogging recoverability in a capped (closed) system.

An ink composition containing the first solid humectant prevents growth of ice crystals and thus improves the low-temperature storage stability of the ink.

According to a preferred embodiment of the invention, the content of the first solid humectant may be adequately determined as long as the effects described above are achieved. However, the first solid humectant content relative to the entire ink composition is preferably 3.0 to 12.0 mass % and more preferably 6.0 to 12.0 mass %. The first saccharide content is preferably within the above-described range, in particular, not below the lower limit, to improve the clogging recoverability in the aforementioned environment and from a viewpoint of gloss. When the amount of the first solid humectant is within the above described range, in particular, not beyond the upper limit, the initial viscosity of the ink is prevented from becoming excessively high and the freezing point is lowered, which is preferable from the viewpoint of low-temperature storage property of the ink. Curling, i.e., inward warpage of a printed surface, can be significantly suppressed even when thin printing paper having a paper density of 73.3 g/m² is used or paper for plain paper copy (PPC) is used. Although the exact reason for this is not clear, the following can be presumed. Cellulose is a long chain-like saccharide constituted by linked (polymerized) monosaccharides. Curling occurs when hydrogen bonds between cellulose units are cut by water molecules and hydrogen bonds between the cellulose units are regenerated in sites different from the sites of the cut hydrogen bonds between the cellulose units as water evaporates. Thus, in order to suppress curling, regeneration of hydrogen bonds between cellulose units should be inhibited as rapidly as possible after evaporation of water. The substance effective as this inhibitor is a crystalline saccharide having a molecular structure similar to cellulose and is preferably trehalose, isotrehalose, or neotrehalose that has excellent drying property and re-crystallizability.

Second Solid Humectant

A second solid humectant preferred in this embodiment is a sugar that remains in a solid state even when it is left to stand still in a 20° C. 60% RH environment for 24 hours. The moisture absorption from 20° C./60% RH to 20° C./80% RH is preferably 10 mass % or more and 30 mass % or less. The second solid humectant preferably has a solubility of 30 mass % or more in 100 g of water at 20° C.

The second solid humectant is not particularly limited as long as the effects of the invention are achieved. Examples thereof include linear maltooligosaccharides that have α-1,4 bonds only, such as maltose, maltotriose, maltotetraose, maltopentaose, maltohexaose, maltoheptaose, maltooctaose, maltononaose, and maltodecaose. Examples of the branched maltooligosaccharides that have α-1,6 bonds in a molecule obtained from a branched portion of amylopectin include isomaltose, panose (glycosyl-maltose), and glycosyl-maltotriose. Other examples include maltitol, sorbitol, xylitol, erythritol, and sucrose. Among these, at least one selected from the group consisting of maltotriose, maltotetraose, and maltopentaose is preferred due to high hygroscopicity. Reduced sugars of these may also be used.

The ink composition containing the second solid humectant can improve the clogging recoverability in a low-humidity environment (open system). The reason for this is not clear but it is presumed that because the second saccharide has high hygroscopicity, it can take in moisture from air even in a low-humidity environment, resulting in high clogging recoverability. Accordingly, stable recording can be realized over a long term without capping the head, for example.

According to a preferred embodiment of the invention, the content of the second solid humectant may be adequately determined as long as the effects described above are achieved. However, the second solid humectant content relative to the entire ink composition is preferably 3.0 to 12.0 mass % and more preferably 6.0 to 12.0 mass %. The content of the second solid humectant having high hygroscopicity is preferably within the above-described range, in particular, not below the lower limit, to improve the clogging recoverability in the high-temperature high-humidity open environment and from a viewpoint of gloss. When the second solid humectant content is within the above described range, in particular, not beyond the upper limit, the glass transition temperature Tg of the ink film is prevented from becoming excessively high and the flexibility can be imparted. This is preferred from the viewpoint of ink fixability. This is also preferred since the first solid humectant having good drying property and re-crystallizability can be prevented from depositing in the waste-liquid portion of a printer.

According to a preferred embodiment of the invention, the ink composition preferably contains 6.0 to 12.0 mass % of the solid humectant.

According to another preferred embodiment of the invention, the total content of the first and second solid humectants is preferably 6.0 to 12.0 mass % relative to the entire ink composition. When the total content is within this range, the clogging recoverability can be improved. The ratio of the content of the first solid humectant to the content of the second solid humectant is not particularly limited but is preferably 1:5 to 5:1. This range is preferred since the clogging recoverability in a closed system can be improved and the flowability of the waste ink can be ensured.

According to a preferred embodiment of the invention, the solid humectant contains at least one selected from the group consisting of a first solid humectant and a second solid humectant. The first solid humectant is preferably at least one selected from the group consisting of trehalose, isotrehalose, neotrehalose, and mannitol. The second solid humectant is preferably at least one selected from the group consisting of maltotriose, maltotetraose, and maltopentaose. When the first and second solid humectants are simultaneously contained as solid humectants in the ink composition, clogging recoverability in the open system and the close system can be improved.

The ratio of the sparingly water-soluble alkanediol content to the solid humectant content is not particularly limited but is preferably 1:4 to 1:12 and more preferably 1:8 to 1:12. This content ratio is preferred from the viewpoint of ink storage stability.

Water-Soluble Alkanediol

The ink composition may contain a water-soluble alkanediol described in the embodiment A in addition to a sparingly water-soluble alkanediol having 7 to 10 carbon atoms, a acyclic saccharide, and a linear saccharide. This embodiment is preferred since bleeding of the substances of the ink composition other than the solid matter, i.e., an aqueous solution containing the solvent, can be further suppressed.

Coloring Material

The ink composition according to the embodiment B of the invention may contain the coloring material described in the embodiment A.

Dispersant

The ink composition according to the embodiment B of the invention may contain the dispersant described in the embodiment A to disperse the coloring material.

Surfactant

The ink composition according to the embodiment B of the invention may contain the surfactant described in the embodiment A.

Water and Other Components

The ink composition according to the embodiment B of the invention may contain the surfactant described in the embodiment A.

The ink composition of this embodiment preferably contains water serving as the solvent described in the embodiment A in addition to the above-described sparingly water-soluble alkanediol having 7 to 10 carbon atoms, a cyclic saccharide, and a linear saccharide.

The ink composition preferably further contains the penetrant described in the embodiment A in addition to the above-described components.

The ink compositions of the embodiments A and B are preferably used in ink jet recording.

Ink Jet Recording Method

According to ink jet recording method that uses the ink compositions according to the embodiments A and B of the invention, droplets of the above-mentioned ink composition are ejected and allowed to adhere onto a recording medium to carry out printing. The recording media used in the recording method of the invention are not particularly limited. For example, plain paper, recording media having aqueous-ink-receiving layers, and non-water-absorbing or low-water-absorbing recording media can be used.

Non-Water-Absorbing or Sparingly Water-Absorbing Recording Media

Examples of the non-water-absorbing recording media include plastic films not surface-treated for ink jet recording (films having no ink receiving layers), and recording media including bases, such as paper sheets, coated with plastic or bonded to plastic films. Examples of the plastic include polyvinyl chloride, polyethylene terephthalate, polycarbonate, polystyrene, polyurethane, polyethylene, and polypropylene.

Examples of the low-water-absorbing recording media include coated papers and recording papers (printing papers) such as ultra light weight coated paper, art paper, coated paper, matte paper, and cast paper.

Coated papers are papers having surfaces coated with coating materials in order to enhance the aesthetic quality and smoothness. A coating material can be prepared by mixing a pigment such as talc, pyrophyllite, clay (kaolin), titanium oxide, magnesium carbonate, or calcium carbonate, with an adhesive such as starch or polyvinyl alcohol. The coating material is applied by using a machine called a coater during production of the paper. The coater can be of an on-machine type in which the coater is directly connected to a paper machine to perform paper-making and coating in one step or of an off-machine type in which paper-making is conducted separately. Coated papers are mainly used in recording and classified as coated printing papers in the classification of the dynamic statistic of production issued by Ministry of Economy, Trade and Industry.

Ultra light weight coated paper refers to recording paper in which the amount of the coating material applied is 12 g/m² or less. Art paper refers to recording paper produced by applying about 40 g/m² of a coating material to woodfree printing paper (high grade paper, paper containing 100% chemical pulp). Coated paper refers to recording paper produced by applying about 20 g/m² to 40 g/m² of a coating material to the base. Cast paper refers to recording paper produced by pressuring surfaces of art paper or coated paper by using a machine called a cast drum so that the gloss and recording effect are enhanced.

Synthetic paper or printing paper (OKT+ produced by Oji Paper Co., Ltd.) is preferably used as the non-water-absorbing or low-water-absorbing recording medium. In particular, recorded matter having good fixability can be obtained on art paper, high-grade paper for print-on-demand (POD) usage, and special paper for laser printers even when low-resolution printing is conducted. Examples of the high image quality paper for POD usage include Ricoh business coat gloss 100 (produced by Ricoh Company, Ltd.). Examples of the special paper for laser printers include LPCCTA4 (product of Seiko Epson Corporation). Examples of the waterproof paper include Kareka (product of Mitsubishi Kagaku Media Co., Ltd.) and Laser Peach (product of Nisshinbo Postal Chemical Co., Ltd.).

Varnish Coating

Recorded matter created by using the ink composition of the invention may be over-coated with an offset varnish or a gravure varnish by using a varnish coater used in commercial printing and the like. Variable printing with high image quality and low-volume high-variety printing can be realized through the ink jet recording and high water resistance and solvent resistance can be realized through overcoating with an offset varnish or a gravure varnish.

EXAMPLES

The invention will now be described in detail by way of Examples which do not limit the scope of the invention.

Example A

Preparation of Ink Composition

Components shown in Table 1 below were mixed according to the compositions shown in the table. Each resulting mixture was filtered through a 10 μm membrane filter to prepare an ink. The figures in Table 1 indicate the contents of the components in the ink in terms of percent by mass. In the case of resins, a solid content in terms of percent by mass is indicated. Trehalose in Table 1 was TREHA fine powder produced by Hayashibara Shoji, Inc. The surfactants used in Examples and Comparative Examples were polyorganosiloxane-based surfactants and were composed of a compound represented by formula (II) with R representing a methyl group, a representing an integer of 6 to 18, m representing 0, and n representing 1 (surfactant 1 with R representing methyl), a compound represented by formula (II) with R representing a hydrogen atom, a representing an integer of 7 to 11, m representing an integer of 30 to 50, and n representing an integer of 3 to 5 (surfactant with R representing a hydrogen atom), and a compound represented by formula (II) with R representing a methyl group, a representing an integer of 9 to 13, m representing an integer of 2 to 4, and n representing an integer of 1 to 2 (surfactant 2 with R representing methyl). The surfactant had a dynamic surface tension of 26 mN/m or less at 1 Hz when prepared into an aqueous solution containing 20 mass % glycerin, 10 mass % 1,2-hexanediol, 0.1 mass % the surfactant, and 69.9 mass % water. In particular, the dynamic surface tension at 1 Hz (=One bubble per second) of the aqueous solution measured with a bubble pressure tensiometer BP2 (product of KRUSS GmbH) was 24.6 mN/m.

TABLE 1

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Methylated β-cyclodextrin (*1) | — | — | 3 | 3 | 3 | 6 | 6 | 6 | 9 | 9 | 9 | 3 | 6 |
| Polydextrose (*2) as a solid content (*3) | 9 | 9 | 3 | 6 | 9 | 3 | 6 | 9 | 3 | 6 | 9 | 9 | 9 |
| Trehalose | 6 | — | — | — | — | — | — | — | — | — | — | 12 | 12 |
| Maltotriose (4*) | — | 6 | — | — | — | — | — | — | — | — | — | — | — |
| Glycerin | — | — | — | — | — | — | — | — | — | — | — | — | — |
| Fructose | — | — | — | — | — | — | — | — | — | — | — | — | — |
| Surfactant 1 with R representing methyl | 0.1 | 0.1 | 0.1 | 0.1 | 0.1 | 0.1 | 0.1 | 0.1 | 0.1 | 0.1 | 0.1 | 0.1 | 0.1 |
| Surfactant 2 with R representing methyl | 0.1 | 0.1 | 0.1 | 0.1 | 0.1 | 0.1 | 0.1 | 0.1 | 0.1 | 0.1 | 0.1 | 0.1 | 0.1 |
| Surfactant with R representing a hydrogen atom | 0.1 | 0.1 | 0.1 | 0.1 | 0.1 | 0.1 | 0.1 | 0.1 | 0.1 | 0.1 | 0.1 | 0.1 | 0.1 |
| Dispersion (*5) | 45.5 | 45.5 | 45.5 | 45.5 | 45.5 | 45.5 | 45.5 | 45.5 | 45.5 | 45.5 | 45.5 | 45.5 | 45.5 |
| Ion exchange water | 39.2 | 39.2 | 48.2 | 45.2 | 42.2 | 45.2 | 42.2 | 39.2 | 42.2 | 39.2 | 36.2 | 30.2 | 27.2 |
| Total | 100 | 100 | 100 | 100 | 100 | 100 | 100 | 100 | 100 | 100 | 100 | 100 | 100 |
| Drying and fixing properties on films | A | A | A | A | A | A | A | A | A | A | A | A | A |
| Drying and fixing properties on printing paper | A | A | B | B | A | B | B | A | B | B | A | A | A |

| | Examples | | | | | | | Comparative Examples | | | | |
|---|---|---|---|---|---|---|---|---|---|---|---|---|
| | 14 | 15 | 16 | 17 | 18 | 19 | 20 | 1 | 2 | 3 | 4 | 5 |
| Methylated β-cyclodextrin (*1) | 9 | 3 | 6 | 9 | 3 | 6 | 9 | — | — | 9 | 9 | 9 |
| Polydextrose (*2) as a solid content (*3) | 9 | 9 | 9 | 9 | 9 | 9 | 9 | 9 | 9 | — | — | — |
| Trehalose | 12 | — | — | — | 6 | 6 | 6 | — | — | — | 6 | — |
| Maltotriose (4*) | — | 12 | 12 | 12 | 6 | 6 | 6 | — | — | — | 6 | — |
| Glycerin | — | — | — | — | — | — | — | 6 | — | — | — | 6 |
| Fructose | — | — | — | — | — | — | — | — | 6 | — | — | 6 |
| Surfactant 1 with R representing methyl | 0.1 | 0.1 | 0.1 | 0.1 | 0.1 | 0.1 | 0.1 | 0.1 | 0.1 | 0.1 | 0.1 | 0.1 |

TABLE 1-continued

|  | | | | | | | | | | | | |
|---|---|---|---|---|---|---|---|---|---|---|---|---|
| Surfactant 2 with R representing methyl | 0.1 | 0.1 | 0.1 | 0.1 | 0.1 | 0.1 | 0.1 | 0.1 | 0.1 | 0.1 | 0.1 | 0.1 |
| Surfactant with R representing a hydrogen atom | 0.1 | 0.1 | 0.1 | 0.1 | 0.1 | 0.1 | 0.1 | 0.1 | 0.1 | 0.1 | 0.1 | 0.1 |
| Dispersion (*5) | 45.5 | 45.5 | 45.5 | 45.5 | 45.5 | 45.5 | 45.5 | 45.5 | 45.5 | 45.5 | 45.5 | 45.5 |
| Ion exchange water | 24.2 | 30.2 | 27.2 | 24.2 | 30.2 | 27.2 | 24.2 | 39.2 | 39.2 | 45.2 | 33.2 | 33.2 |
| Total | 100 | 100 | 100 | 100 | 100 | 100 | 100 | 100 | 100 | 100 | 100 | 100 |
| Drying and fixing properties on films | A | A | A | A | A | A | A | B | B | B | B | B |
| Drying and fixing properties on printing paper | A | A | A | A | A | A | A | C | C | C | C | C |

(*1): Trade name: CAVASOL ® W7 M (produced by Wacker Chemie AG)
(*2): Trade name: Litesse III (Danisco Japan)
(*3): A polydextrose was used as a 70% aqueous solution which was added in amounts of 4.3 mass %, 8.6 mass %, and 12.8 mass % so that the solid contents indicated in the table could be achieved.
(*4): Trade name: Oligotose (produced by Sanwa Cornstarch Co., Ltd.)
(*5): The dispersion contains 11 mass % pigment, 2.2 mass % styrene-acrylic acid copolymer, 2.2 mass % fluorene resin, 1.1 mass % 1,6-hexanediol, and the balance being water.

In Table 1, "Y" in the ink set below contains C.I. Pigment Yellow 74 as a pigment. "M" contains C.I. Pigment Violet 19 as a pigment. "C" contains C.I. Pigment Blue 15:3 as a pigment. "K" contains C.I. Pigment Black 7 as a pigment.

The "duty" used below is a value calculated from the following equation:

$$\text{Duty (\%)} = \text{Number of actually recorded dots}/(\text{vertical resolution} \times \text{horizontal resolution}) \times 100$$

(In the equation, the "number of actually recorded dots" is a number of actually recorded dots per unit area and the "vertical resolution" and the "horizontal resolution" is each a resolution per unit area.

Evaluation

Evaluation of Drying and Fixing Properties on Printing Paper

An ink set including Y, M, C, and K inks obtained as above was prepared and charged into an ink cartridge of an ink jet printer (PXG 930 product of Seiko Epson Corporation). The cartridge was loaded in the printer. The order in which the inks were loaded was YYMMCCKK with Y being farthest from the cap and K being the nearest to the cap. Inks were then charged in a printer head using a printer driver and it was confirmed that normal recording was possible.

Recording was conducted at 720 dpi in a main scanning (head driving) direction and at 360 dpi in a sub-scanning (recording medium-feeding) direction. Then the voltage applied to piezoelectric elements of the printer head was adjusted so that the dot side at the time of landing was about 3 ng. A 720×1440 dpi image was recorded in one direction on OKT+ (product of Oji Paper Co., Ltd.) having a paper density of about 73.3 g/m² at 720×360 dpi per drive.

The temperature of the medium at the time of recording was about 37° C. The distance between the recording paper and the recording head was 1 mm. The recorded image was an image of one duty-100% primary color and the amount of ink adhered was 3.1 mg/inch².

Immediately after the recorded image was output, a test was carried out by using a Gakushin-type rubbing tester (AB-301 COLOR FASTNESS RUBBING TESTER, produced by TESTER SANGYO., LTD.) at a load of 500 g for 10 cycles. The printed matter was scanned with a scanner, the captured image was digitalized with Photoshop CS5, and the fixed area ratio was calculated.

The obtained image was evaluated according to the following standard.

A: The fixed area ratio of the printed surface was 60% or more and less than 80%.
B: The fixed area ratio of the printed surface was 40% or more and less than 60%.
C: The fixed area ratio of the printed surface was less than 40%.

The results are indicated in Table 1.

Evaluation of Drying and Fixing Properties on Films

An image was recorded as described in "Evaluation of drying and fixing properties on printing paper" except that the recording medium was changed to Lumirror S10 (100 micrometers in thickness, product of Toray Industries, Inc.). The resulting recorded image was left to stand in a 20° C., 40% RH environment for 10 minutes and then scratched with fingernails to evaluate the drying and fixing properties.

The evaluation standard was as follows.

A: The coloring material did not come off from the scratched portion.
B: The coloring material came off from the scratched portion.

The results are indicated in Table 1.

Ink compositions and ink sets of Examples were respectively obtained in the same manner except that 1,6-hexanediol used as a resin-dissolving agent contained in making the dispersion was changed to 1,2-hexanediol. The evaluation of drying and fixing properties on films and printing paper was conducted as described above. The evaluation results were the same even when 1,6-hexanediol was changed to 1,2-hexanediol.

Ink compositions and ink sets of Examples were respectively obtained in the same manner except that the styrene-acrylic acid copolymer which is a dispersed resin contained in making the dispersant was changed to an oxyethyl resin. The evaluation of drying and fixing properties on films and printing paper was conducted as described above. The evaluation results were the same even when the styrene-acrylic acid copolymer was changed to the oxyethyl resin.

Example B

Preparation of Ink Composition

Components shown in Table 2 below were mixed according to the compositions shown in the table. Each resulting mixture was filtered through a 10 μm membrane filter to prepare an ink. The figures in Table 2 indicate the contents of the components in the ink in terms of percent by mass. In the case of resins, a solid content in terms of percent by mass is indicated. Trehalose in Table 2 was TREHA fine powder produced by Hayashibara Shoji, Inc. The surfactants used in Examples and Comparative Examples were polyorganosiloxane-based surfactants and were composed of a compound represented by formula (II) with R representing a methyl group, a representing an integer of 6 to 18, m representing 0, and n representing 1 (surfactant 1 with R representing methyl), a compound represented by formula (II) with R representing a hydrogen atom, a representing an integer of 7 to 11, m representing an integer of 30 to 50, and n representing an integer of 3 to 5 (surfactant with R representing a hydrogen atom), and a compound represented by formula (II) with R representing a methyl group, a representing an integer of 9 to 13, m representing an integer of 2 to 4, and n representing an integer of 1 to 2 (surfactant 2 with R representing methyl). The surfactant had a dynamic surface tension of 26 mN/m or less at 1 Hz when prepared into an aqueous solution containing 20 mass % glycerin, 10 mass % 1,2-hexanediol, 0.1 mass % the surfactant, and 69.9 mass % water. In particular, the dynamic surface tension at 1 Hz (=One bubble per second) of the aqueous solution measured with a bubble pressure tensiometer BP2 (product of KRUSS GmbH) was 24.6 mN/m.

TABLE 2

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| 1,2-Octanediol | 1 | 1 | 1 | 1 | 1 | 1 | 1 | 1 | 1 | 3 | 3 |
| Methylated β-cyclodextrin (*1) | 3 | 3 | 3 | 6 | 6 | 6 | 9 | 9 | 9 | 3 | 3 |
| Polydextrose (*2) as a solid content (*3) | 3 | 6 | 9 | 3 | 6 | 9 | 3 | 6 | 9 | 3 | 6 |
| Surfactant 1 with R representing methyl | 0.1 | 0.1 | 0.1 | 0.1 | 0.1 | 0.1 | 0.1 | 0.1 | 0.1 | 0.1 | 0.1 |
| Surfactant 2 with R representing methyl | 0.1 | 0.1 | 0.1 | 0.1 | 0.1 | 0.1 | 0.1 | 0.1 | 0.1 | 0.1 | 0.1 |
| Surfactant with R representing a hydrogen atom | 0.1 | 0.1 | 0.1 | 0.1 | 0.1 | 0.1 | 0.1 | 0.1 | 0.1 | 0.1 | 0.1 |
| Dispersion (*4) | 45.5 | 45.5 | 45.5 | 45.5 | 45.5 | 45.5 | 45.5 | 45.5 | 45.5 | 45.5 | 45.5 |
| Ion exchange water | 47.2 | 44.2 | 41.2 | 44.2 | 41.2 | 38.2 | 41.2 | 38.2 | 35.2 | 45.2 | 42.2 |
| Total | 100 | 100 | 100 | 100 | 100 | 100 | 100 | 100 | 100 | 100 | 100 |
| Drying and fixing properties (printing paper) | A | A | AA | B | A | A | B | B | A | A | A |
| Drying and fixing properties (films) | A | A | A | A | A | A | A | A | A | A | A |
| Beading property (printing paper) | A | A | AA | A | A | AA | A | A | AA | A | AA |
| Evaluation of storage stability | A | A | A | A | A | A | A | A | A | B | B |
| Close-system clogging recoverability | B | B | B | B | B | B | B | B | B | B | B |
| Open-system clogging recoverability | B | B | B | B | B | B | B | B | B | B | B |

| | Examples | | | | | | | Comparative Examples | | |
|---|---|---|---|---|---|---|---|---|---|---|
| | 12 | 13 | 14 | 15 | 16 | 17 | 18 | 1 | 2 | 3 |
| 1,2-Octanediol | 3 | 3 | 3 | 3 | 3 | 3 | 3 | 1 | 0 | 1 |
| Methylated β-cyclodextrin (*1) | 3 | 6 | 6 | 6 | 9 | 9 | 9 | 3 | 3 | 0 |
| Polydextrose (*2) as a solid content (*3) | 9 | 3 | 6 | 9 | 3 | 6 | 9 | 0 | 9 | 9 |
| Surfactant 1 with R representing methyl | 0.1 | 0.1 | 0.1 | 0.1 | 0.1 | 0.1 | 0.1 | 0.1 | 0.1 | 0.1 |
| Surfactant 2 with R representing methyl | 0.1 | 0.1 | 0.1 | 0.1 | 0.1 | 0.1 | 0.1 | 0.1 | 0.1 | 0.1 |
| Surfactant with R representing a hydrogen atom | 0.1 | 0.1 | 0.1 | 0.1 | 0.1 | 0.1 | 0.1 | 0.1 | 0.1 | 0.1 |
| Dispersion (*4) | 45.5 | 45.5 | 45.5 | 45.5 | 45.5 | 45.5 | 45.5 | 45.5 | 45.5 | 45.5 |
| Ion exchange water | 39.2 | 42.2 | 39.2 | 36.2 | 39.2 | 36.2 | 33.2 | 50.2 | 42.2 | 44.2 |
| Total | 100 | 100 | 100 | 100 | 100 | 100 | 100 | 100 | 100 | 100 |
| Drying and fixing properties (printing paper) | AA | B | A | A | B | B | A | C | A | AA |
| Drying and fixing properties (films) | A | A | A | A | A | A | A | B | A | A |
| Beading property (printing paper) | AA | A | AA | AA | A | AA | AA | AA | C | AA |
| Evaluation of storage stability | B | B | B | B | B | B | B | A | A | C |
| Close-system clogging recoverability | B | B | B | B | B | B | B | B | B | B |
| Open-system clogging recoverability | B | B | B | B | B | B | B | B | B | B |

| | Examples | | | | | | | | | | |
|---|---|---|---|---|---|---|---|---|---|---|---|
| | 19 | 20 | 21 | 22 | 23 | 24 | 25 | 26 | 27 | 28 | 29 |
| 1,2-Octanediol | 1 | 1 | 1 | 3 | 3 | 3 | 1 | 1 | 1 | 3 | 3 |
| Methylated β-cyclodextrin (*1) | 3 | 6 | 9 | 3 | 6 | 9 | 3 | 6 | 9 | 3 | 6 |
| Polydextrose (*2) as a solid content (*3) | 9 | 9 | 9 | 9 | 9 | 9 | 9 | 9 | 9 | 9 | 9 |
| Surfactant 1 with R representing methyl | 0.1 | 0.1 | 0.1 | 0.1 | 0.1 | 0.1 | 0.1 | 0.1 | 0.1 | 0.1 | 0.1 |
| Surfactant 2 with R representing methyl | 0.1 | 0.1 | 0.1 | 0.1 | 0.1 | 0.1 | 0.1 | 0.1 | 0.1 | 0.1 | 0.1 |
| Surfactant with R representing a hydrogen atom | 0.1 | 0.1 | 0.1 | 0.1 | 0.1 | 0.1 | 0.1 | 0.1 | 0.1 | 0.1 | 0.1 |
| Dispersion (*4) | 45.5 | 45.5 | 45.5 | 45.5 | 45.5 | 45.5 | 45.5 | 45.5 | 45.5 | 45.5 | 45.5 |
| Trehalose | 12 | 12 | 12 | 12 | 12 | 12 | 0 | 0 | 0 | 0 | 0 |
| Maltotriose (*5) | 0 | 0 | 0 | 0 | 0 | 0 | 12 | 12 | 12 | 12 | 12 |
| Ion exchange water | 29.2 | 26.2 | 23.2 | 27.2 | 24.2 | 21.2 | 29.2 | 26.2 | 23.2 | 27.2 | 24.2 |
| Total | 100 | 100 | 100 | 100 | 100 | 100 | 100 | 100 | 100 | 100 | 100 |
| Drying and fixing properties (printing paper) | AA | A | A | AA | A | A | AA | A | A | AA | A |
| Drying and fixing properties (films) | A | A | A | A | A | A | A | A | A | A | A |
| Beading property (printing paper) | AA | AA | AA | AA | AA | AA | AA | AA | AA | AA | AA |
| Evaluation of storage stability | A | A | A | B | B | B | A | A | A | B | B |
| Close-system clogging recoverability | A | A | A | A | A | A | B | B | B | B | B |
| Open-system clogging recoverability | B | B | B | B | B | B | A | A | A | A | A |

| | Examples | | | | | | | Comparative Examples | | |
|---|---|---|---|---|---|---|---|---|---|---|
| | 30 | 31 | 32 | 33 | 34 | 35 | 36 | 4 | 5 | 6 |
| 1,2-Octanediol | 3 | 1 | 1 | 1 | 3 | 3 | 3 | 1 | 0 | 1 |
| Methylated β-cyclodextrin (*1) | 9 | 3 | 6 | 9 | 3 | 6 | 9 | 3 | 3 | 0 |
| Polydextrose (*2) as a solid content (*3) | 9 | 9 | 9 | 9 | 9 | 9 | 9 | 0 | 9 | 9 |
| Surfactant 1 with R representing methyl | 0.1 | 0.1 | 0.1 | 0.1 | 0.1 | 0.1 | 0.1 | 0.1 | 0.1 | 0.1 |

TABLE 2-continued

| | | | | | | | | | | |
|---|---|---|---|---|---|---|---|---|---|---|
| Surfactant 2 with R representing methyl | 0.1 | 0.1 | 0.1 | 0.1 | 0.1 | 0.1 | 0.1 | 0.1 | 0.1 | 0.1 |
| Surfactant with R representing a hydrogen atom | 0.1 | 0.1 | 0.1 | 0.1 | 0.1 | 0.1 | 0.1 | 0.1 | 0.1 | 0.1 |
| Dispersion (*4) | 45.5 | 45.5 | 45.5 | 45.5 | 45.5 | 45.5 | 45.5 | 45.5 | 45.5 | 45.5 |
| Trehalose | 0 | 6 | 6 | 6 | 6 | 6 | 6 | 6 | 6 | 6 |
| Maltotriose (*5) | 12 | 6 | 6 | 6 | 6 | 6 | 6 | 6 | 6 | 6 |
| Ion exchange water | 21.2 | 29.2 | 26.2 | 23.2 | 27.2 | 24.2 | 21.2 | 38.2 | 30.2 | 32.2 |
| Total | 100 | 100 | 100 | 100 | 100 | 100 | 100 | 100 | 100 | 100 |
| Drying and fixing properties (printing paper) | A | AA | A | A | AA | A | A | C | A | AA |
| Drying and fixing properties (films) | A | A | A | A | A | A | A | B | A | A |
| Beading property (printing paper) | AA | AA | AA | AA | AA | AA | AA | AA | C | AA |
| Evaluation of storage stability | B | A | A | A | B | B | B | A | A | C |
| Close-system clogging recoverability | B | A | A | A | A | A | A | A | A | A |
| Open-system clogging recoverability | A | A | A | A | A | A | A | A | A | A |

(*1): Trade name: CAVASOL ® W7 M (produced by Wacker Chemie AG)
(*2): Trade name: Litesse III (Danisco Japan)
(*3): A polydextrose was used as a 70% aqueous solution which was added in amounts of 4.3 mass %, 8.6 mass %, and 12.8 mass % so that the solid contents indicated in the table could be achieved.
(*4): The dispersion contains 11 mass % pigment, 2.2 mass % styrene-acrylic acid copolymer, 2.2 mass % fluorene resin, 1.1 mass % 1,6-hexanediol, and the balance being water.
(*5): Trade name: Oligotose (produced by Sanwa Cornstarch Co., Ltd.)

In Table 2, "Y" in the ink set below contains C.I. Pigment Yellow 74 as a pigment. "M" contains C.I. Pigment Violet 19 as a pigment. "C" contains C.I. Pigment Blue 15:3 as a pigment. "K" contains C.I. Pigment Black 7 as a pigment.

The "duty" used below is a value calculated from the following equation:

Duty (%)=Number of actually recorded dots/(vertical resolution×horizontal resolution)×100

(In the equation, the "number of actually recorded dots" is a number of actually recorded dots per unit area and the "vertical resolution" and the "horizontal resolution" is each a resolution per unit area.

Evaluation

Evaluation of Drying and Fixing Properties on Printing Paper

An ink set including Y, M, C, and K inks obtained as above was prepared and charged into an ink cartridge of an ink jet printer (PXG 930 product of Seiko Epson Corporation). The cartridge was loaded in the printer. The order in which the inks were loaded was YYMMCCKK with Y being farthest from the cap and K being the nearest to the cap. Inks were then charged in a printer head using a printer driver and it was confirmed that normal recording was possible.

Recording was conducted at 720 dpi in a main scanning (head driving) direction and at 360 dpi in a sub-scanning (recording medium-feeding) direction. Then the voltage applied to piezoelectric elements of the printer head was adjusted so that the dot side at the time of landing was about 3 ng. A 720×1440 dpi image was recorded in one direction on OKT+ (product of Oji Paper Co., Ltd.) having a paper density of about 73.3 g/m$^2$ at 720×360 dpi per drive.

The temperature of the medium at the time of recording was about 37° C. The distance between the recording paper and the recording head was 1 mm. The recorded image was an image of one duty-100% primary color and the amount of ink adhered was 3.1 mg/inch$^2$.

Immediately after the recorded image was output and a test was carried out by using a Gakushin-type rubbing tester (AB-301 COLOR FASTNESS RUBBING TESTER, produced by TESTER SANGYO., LTD.) at a load of 500 g for 10 cycles. The printed matter was scanned with a scanner, the captured image was digitalized with Photoshop CS5, and the fixed area ratio was calculated. The obtained image was evaluated according to the following standard.

AA: The fixed area ratio of the printed surface was 80% or more.

A: The fixed area ratio of the printed surface was 60% or more and less than 80%.

B: The fixed area ratio of the printed surface was 40% or more and less than 60%.

C: The fixed area ratio of the printed surface was less than 40%.

The results are indicated in Table 2.

Evaluation of Drying and Fixing Properties on Films

An image was recorded as described in "Evaluation of drying and fixing properties on printing paper" except that the recording medium was changed to Lumirror S10 (100 micrometers in thickness, product of Toray Industries, Inc.). The resulting recorded image was left to stand in a 20° C., 40% RH environment for 10 minutes and then scratched with fingernails to evaluate the drying and fixing properties. The evaluation standard was as follows.

A: The coloring material did not come off from the scratched portion.

B: The coloring material came off from the scratched portion.

The results are indicated in Table 2.

Evaluation of Ink Beading (Image Quality) on Printing Paper (Beading Property)

An ink set including Y, M, C, and K inks obtained as above was prepared and charged into an ink cartridge of an ink jet printer (PXG 930 product of Seiko Epson Corporation). The cartridge was loaded in the printer. The order in which the inks were loaded was YYMMCCKK with Y being farthest from the cap and K being the nearest to the cap. Inks were then charged in a printer head using a printer driver and it was confirmed that normal recording was possible.

Recording was conducted at 720 dpi in a main scanning (head driving) direction and at 360 dpi in a sub-scanning (recording medium-feeding) direction. Then the voltage applied to piezoelectric elements of the printer head was adjusted so that the dot side at the time of landing was about 7 ng. A 720×720 dpi image was recorded in one direction on OKT+ (product of Oji Paper Co., Ltd.) having a paper density of about 73.3 g/m2 at 720×360 dpi per drive. The amount of ink of single color that adhered at 100% duty was 3.1 mg/inch$^2$, for example. The temperature of the medium at the time of recording was about 20° C.

The distance between the recording paper and the recording head was 1 mm. The recorded image was an image of a secondary color formed by mixing single colors at the same duty. The obtained image was evaluated according to the following standard.

AA: Up to a 200% duty secondary color constituted by 100% duty single colors was reproduced without beading.

A: Up to a 160% duty secondary color constituted by 80% duty single colors was reproduced without beading.

B: Up to a 120% duty secondary color constituted by 60% duty single colors was reproduced without beading but a 160% duty secondary color constituted by 80% duty single colors could not be reproduced.

C: Up to a 80% duty secondary color constituted by 40% duty single colors was reproduced without beading. However, a 120% duty secondary color constituted by 60% duty single colors could not be reproduced due to beading.

The results are indicated in Table 2.

Evaluation of Storage Stability

The viscosities of the inks Y, M, C, and K obtained as above was were measured at 20° C. and assumed to be the initial viscosities. Then each ink in an amount of 100 g was placed in a 110 ml LABORAN sample bottle (produced by ASONE Corporation) and a lid was placed. The bottle was left at 70° C. for one week and then left to stand to cool to 20° C. The viscosity of the ink after being left at 20° C. was measured.

A: The change in viscosity was less than 0.4 mPas.

B: The change in viscosity was 0.4 mPas or more and less than 0.8 mPas.

C: The change in viscosity was 0.8 mPas or more.

The results are indicated in Table 2.

Clogging Recoverability in a High-Temperature, Low-Humidity Open System (Open-System Clogging Recoverability)

An ink set including Y, M, C, and K inks obtained as above was prepared and charged into an ink cartridge of an ink jet printer (PXG 930 product of Seiko Epson Corporation). The cartridge was loaded in the printer. The order in which the inks were loaded was YYMMCCKK with Y being farthest from the cap and K being the nearest to the cap. Inks were then charged in a printer head using a printer driver and it was confirmed that normal recording was possible. The carriage was moved to an ink cartridge replacement position. The printer was then unplugged. The ink cartridge and then the printer head were removed. The head from which the ink cartridge and the head cap were removed was left to stand in a 40° C., 20% RH environment for 3 days.

Then the head left in the carriage was loaded as before, the ink cartridge which had been left in a normal-temperature, normal-humidity environment was reloaded, and cleaning operation was repeated until all nozzles ejected inks in the same manner as the initial stage. The recoverability was evaluated according to the following standard.

A: Clogging was resolved by repeating the cleaning operation 12 or less times.

B: Clogging was not resolved by repeating the cleaning operation 12 times.

The results are indicated in Table 2.

Clogging Recoverability in a High-Temperature Normal-Humidity Closed System (Close-System Clogging Recoverability)

An ink set including Y, M, C, and K inks obtained as above was prepared and charged into an ink cartridge of an ink jet printer (PXG 930 product of Seiko Epson Corporation). The cartridge was loaded in the printer. The order in which the inks were loaded was YYMMCCKK with Y being farthest from the cap and K being the nearest to the cap. Inks were then charged in a printer head using a printer driver and it was confirmed that normal recording was possible. Then according to a normal procedure, the switch was pressed to turn off the power and the printer was unplugged. The printer with the ink cartridge and the head cap loaded therein was left to stand in a 40° C., 45% RH environment for 7 days.

Then the printer was turned on, and cleaning operation was repeated until all nozzles ejected inks in the same manner as the initial stage. The recoverability was evaluated according to the following standard.

A: Clogging was resolved by repeating the cleaning operation 12 or less times.

B: Clogging was not resolved by repeating the cleaning operation 12 times.

The results are indicated in Table 2.

Ink compositions and ink sets of Examples were respectively obtained in the same manner except that 1,6-hexanediol used as a resin-dissolving agent contained in making the dispersion was changed to 1,2-hexanediol. The drying and fixing properties, the beading property, the storage stability, the open-system clogging recoverability, and the close-system clogging recoverability were evaluated as described above. The evaluation results were the same even when 1,6-hexanediol was changed to 1,2-hexanediol.

Ink compositions and ink sets of Examples were respectively obtained in the same manner except that the styrene-acrylic acid copolymer which is a dispersed resin contained in making the dispersant was changed to an oxyethyl resin. The drying and fixing properties, the beading property, the storage stability, the open-system clogging recoverability, and the close-system clogging recoverability were evaluated as described above. The evaluation results were the same even when the styrene-acrylic acid copolymer was changed to the oxyethyl resin.

What is claimed is:

1. An ink composition comprising:
    a first saccharide;
    a second saccharide,
    wherein:
        the first saccharide is a linear saccharide having 4 or more saccharide unit;
        the second saccharide is a cyclic saccharide comprising a methylated β-cyclodextrin; and
        the ratio of a first saccharide content to a second saccharide content is in the range of about 3:1 to about 1:3; and
    a solid humectant which is solid at 20° C. and a relative humidity of 60%, wherein:
        the solid humectant contains at least one selected from the group consisting of a first solid humectant and a second solid humectant;
        the first solid humectant is at least one selected from the group consisting of trehalose, isotrehalose, neotrehalose, and mannitol; and
        the second solid humectant is at least one selected from the group consisting of maltotriose, maltotetraose, and maltopentaose.

2. The ink composition according to claim 1, wherein the first saccharide is a polydextrose.

3. The ink composition according to claim 1, wherein the second saccharide content in the ink composition is 3.0 to 9.0 mass %.

4. The ink composition according to claim 1, wherein a first saccharide content in the ink composition is 3.0 to 9.0 mass %.

5. An ink composition comprising:

a sparingly water-soluble alkanediol having 7 to 10 carbon atoms;

a first saccharide;

a second saccharide, wherein:

the first saccharide is a linear saccharide having 4 or more saccharide units;

the second saccharide is a cyclic saccharide comprising a methylated β-cyclodextrin; and the ratio of a cyclic saccharide content to a linear saccharide content is about 3:1 to about 1:3; and a solid humectant which is solid at 20° C. and a relative humidity of 60%, wherein:

the solid humectant contains at least one selected from the group consisting of a first solid humectant and a second solid humectant;

the first solid humectant is at least one selected from the group consisting of trehalose, isotrehalose, neotrehalose, and mannitol; and the second solid humectant is at least one selected from the group consisting of maltotriose, maltotetraose, and maltopentaose.

6. The ink composition according to claim 5, wherein the linear saccharide is a polydextrose.

7. The ink composition according to claim 5, wherein the second saccharide content in the ink composition is 3.0 to 9.0 mass %.

8. The ink composition according to claim 5, wherein a linear saccharide content in the ink composition is 3.0 to 9.0 mass %.

9. The ink composition according to claim 5, wherein the total content of the sparingly water-soluble alkanediol having 7 to 10 carbon atoms and the linear saccharide is 4.0 to 12.0 mass %.

* * * * *